United States Patent
Bovino

(10) Patent No.: US 9,490,909 B2
(45) Date of Patent: Nov. 8, 2016

(54) METHOD AND SYSTEM FOR ESTIMATING THE NOISE OF A TWO-PHOTON ENTANGLED STATE

(71) Applicant: SELEX ES S.P.A., Rome (IT)

(72) Inventor: Fabio Antonio Bovino, Rome (IT)

(73) Assignee: SELEX ES S.P.A., I-Roma (IT)

( * ) Notice: Subject to any disclaimer, the term of this patent is extended or adjusted under 35 U.S.C. 154(b) by 15 days.

(21) Appl. No.: 14/369,654

(22) PCT Filed: Dec. 31, 2012

(86) PCT No.: PCT/IB2012/057841
§ 371 (c)(1),
(2) Date: Jun. 27, 2014

(87) PCT Pub. No.: WO2013/098796
PCT Pub. Date: Jul. 4, 2013

(65) Prior Publication Data
US 2015/0003824 A1     Jan. 1, 2015

(30) Foreign Application Priority Data
Dec. 30, 2011  (IT) .............................. TO2011A1244

(51) Int. Cl.
*H04B 10/08*     (2006.01)
*H04B 17/00*     (2015.01)
(Continued)

(52) U.S. Cl.
CPC .......... *H04B 10/70* (2013.01); *H04B 10/0795* (2013.01); *H04L 9/0852* (2013.01); *H04L 2209/24* (2013.01)

(58) Field of Classification Search
CPC .................. H04L 25/0224; H04L 25/03178; H04L 9/0858; H04B 10/70

USPC ........................................ 398/25, 26, 27, 40
See application file for complete search history.

(56) References Cited

U.S. PATENT DOCUMENTS 7,831,050 B2 * 11/2010 Barbosa ................ H04L 9/0858
380/256
2004/0264958 A1 * 12/2004 Zoller .................... H04B 10/70
398/40

(Continued)

FOREIGN PATENT DOCUMENTS

EP          1730879        1/2012
IT      TO2003A000069       2/2003

OTHER PUBLICATIONS

D.S. Naik, C. G. Peterson, "Entangled State Quantum Cryptography: Eavesdropping on the Ekert Protocol", May 15, 2000, Physical Review Letters, vol. 84, No. 20, pp. 4733-4736.*

(Continued)

*Primary Examiner* — David Payne
*Assistant Examiner* — Pranesh Barua
(74) *Attorney, Agent, or Firm* — Dorsey & Whitney LLP

(57) ABSTRACT

A method for estimating the noise of a two-photon entangled state, including generating pairs of photons; for each pair of photons, defining a first polarization measurement, associated with a first angle, and defining a second polarization measurement, associated with a second angle. The method includes generating a first string of polarization measurements and a first string of angles; generating a second string of polarization measurements and a second string of angles; generating a first uncorrelated substring, formed by the polarization measurements of the first string associated with angles that are different from the corresponding angles of the second string of angles; generating a second uncorrelated substring, formed by the polarization measurements of the second string associated with angles that are different from the corresponding angles of the first string of angles; and determining an estimate of the noise on the basis of the first and the second uncorrelated substrings.

9 Claims, 5 Drawing Sheets

(51) Int. Cl.
  *H04B 10/00* (2013.01)
  *H04B 10/70* (2013.01)
  *H04L 9/08* (2006.01)
  *H04B 10/079* (2013.01)

(56) References Cited

U.S. PATENT DOCUMENTS

| | | | | |
|---|---|---|---|---|
| 2005/0135620 | A1* | 6/2005 | Kastella | H04L 9/12 380/256 |
| 2006/0198362 | A1* | 9/2006 | Molev-Shteiman | H04L 25/03038 370/352 |
| 2006/0198433 | A1* | 9/2006 | Molev-Shteiman | H04L 1/005 375/229 |
| 2007/0065154 | A1* | 3/2007 | Luo | H04B 10/70 398/141 |
| 2009/0317089 | A1* | 12/2009 | Peters | H04L 9/0855 398/173 |
| 2010/0148751 | A1* | 6/2010 | Okayasu | G01R 29/26 324/76.52 |
| 2010/0309469 | A1* | 12/2010 | Kanter | H04B 10/70 356/364 |
| 2011/0013906 | A1* | 1/2011 | Stevenson | B82Y 10/00 398/25 |
| 2011/0164670 | A1* | 7/2011 | Abad Molina | H04L 5/0046 375/227 |
| 2013/0011144 | A1* | 1/2013 | Amiri Farahani | A61B 6/5258 398/208 |

OTHER PUBLICATIONS

Bennett et al., "Experimental Quantum Cryptography", Journal of Cryptology, 1992, vol. 5, pp. 3-28.
D. Naik et al: "Entagled State Quantum Cryptography: Eavesdropping on the Ekert Protocol", Physical Review Letters, vol. 84, No. 20, May 1, 2000, pp. 4733-4736.
Gisin N. et al: "Quantum Cryptography", Reviews of Modern Physics, American Physical Society, US, vol. 74, No. 1, Jan. 1, 2002, pp. 145-195.
Dietmar G. Fischer et al: "Enhanced Estimation of a Noisy Quantum Channel Using Entaglement", arXiv, Mar. 29, 2001, pp. 1-4.
International Search Report and Written Opinion from International Application No. PCT/IB2012/057841 mailed Mar. 27, 2013.
Bennett et al: "Quantum Cryptography: Public key distribution and coin tossing", Proc. of the IEEE Int. Conf. on Computers, Systems & Signal Processing, Bangalore, India, Dec. 10-12, 1984, pp. 175-179.
Bovino et al: "Experimental noise resistant Bell inequality violations for polarization-entangled photons", Physical Review A 73: 062110 (2006) pp. 1-4.

* cited by examiner

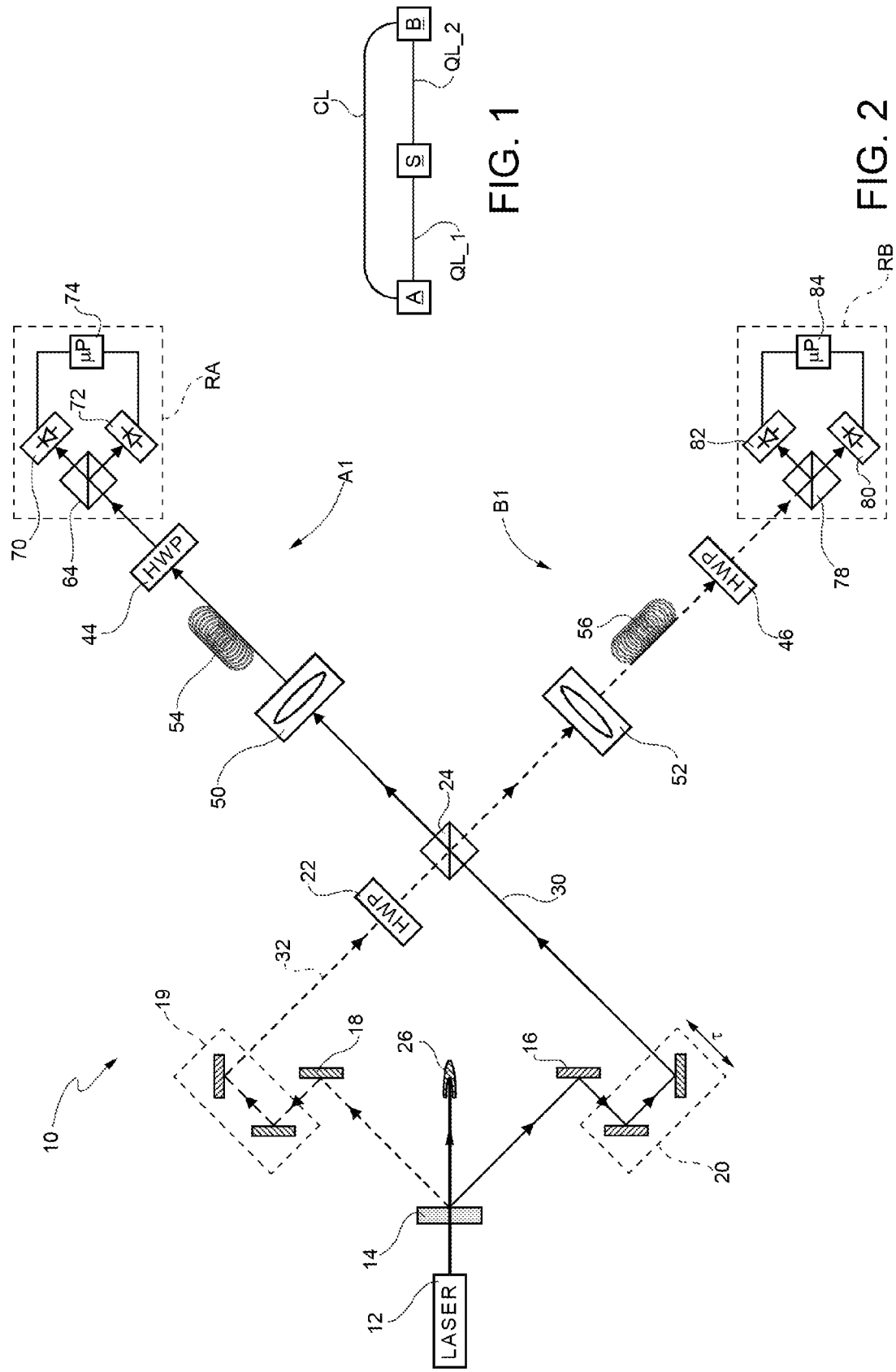

METHOD AND SYSTEM FOR ESTIMATING THE NOISE OF A TWO-PHOTON ENTANGLED STATE

TECHNICAL FIELD

The present invention relates to a method and to a system for estimating the noise of a two-photon entangled state.

BACKGROUND ART

As is known, quantum key distribution (QKD) is a technique based on the principles of quantum mechanics, which allows two communications devices linked by a quantum channel to generate a random cryptographic key, called a quantum key, which can be used by the communications devices, or by the users of the communications devices, to communicate with each other in a secure manner over a public channel, i.e. an eavesdroppable channel, such as an Internet connection for example.

As is known, the traditional cryptographic key distribution protocols do not allow detecting whether the distributed cryptographic keys have been eavesdropped. In particular, traditional cryptographic key distribution protocols do not allow discovering whether a cryptographic key distributed before starting an encrypted communication based on this cryptographic key has been eavesdropped, for example, through a man-in-the-middle attack.

Instead, QKD allows detecting whether somebody has attempted to abusively eavesdrop the quantum key. In particular, QKD not only enables detecting whether or not somebody has abusively eavesdropped some information exchanged and/or some photons transmitted over the quantum channel during the generation of the quantum key, but also prevents eavesdropped information from being used to trace to the quantum key.

More specifically, for example, the so-called BB84 protocol, described for the first time by C. H. Bennett and G. Brassard in "*Quantum cryptography: Public key distribution and coin tossing*", Proc. of the IEEE Int. Conf. on Computers, Systems & Signal Processing, Bangalore, India, Dec. 10-12, 1984, pp. 175-179, is known.

As shown in FIG. 1, where two communications devices are referred to respectively as the first and second communications devices A and B, an implementation of the BB84 protocol envisages the presence of a source S in addition to the first and second communications devices A and B. The source S is connected to the first and second communications devices A and B by a first and a second quantum link QL_1 and QL_2, respectively, each of which is formed, for example, by a span of optical fibre or free space. In practice, the first and second quantum links QL_1 and QL_2 form a quantum channel, interposed between the first and second communications devices A and B; the source S, in turn, is connected to the quantum channel. The first and second communications devices A and B are also connected to each other by a conventional link (i.e., non-quantum) CL, such as a link via the Internet for example.

In operation, the source S transmits, in use, entangled pairs of photons. More specifically, the source S emits one of the so-called Bell states, such as, for example, a singlet state in polarization.

Given an entangled pair of photons emitted from the source S, one of them propagates along the first quantum link QL_1 and can therefore be received by the first communications device A, while the other propagates along the second quantum link QL_2 and can therefore be received by the second communications device B. For example, the photon that propagates along the first quantum link QL_1 and the photon that propagates along the second quantum link QL_2 can be referred to as photon FA and photon FB, respectively.

In principle, each of the first and second communications devices A and B performs, for each photon received, the following operations:
   randomly selects a basis, chosen from a set of two polarization bases;
   measures the polarization of the received photon, using the selected basis;
   determines a corresponding bit, one-to-one associated with the measured polarization; and
   stores the determined bit, the selected basis and the time when the photon was received.

As described in greater detail hereinafter, each of the first and second communications devices A and B has a respective polarizing beam splitter (PBS), the input of which is connected to the corresponding quantum link. Furthermore, each basis of the set of two possible polarization bases is associated with a corresponding rotation angle; therefore, the set of two polarization bases corresponds to a set of two rotation angles, typically equal to 0° and 45°.

In practice, at the level of principle, each of the first and second communications devices A and B rotates its polarizing beam splitter by an angle of alternatively 0° or 45°, with respect to a predetermined position.

If the source S emits, for example, a singlet state, and assuming that photon FA and photon FB are received by the first and the second communications devices A and B with a same basis, it is found that (ideally) a perfect anticorrelation is present between the polarization of the photon FA and the polarization of the photon FB, as measured precisely by the first and the second communications device A and B. Instead, in the case where the first and the second communications device A and B respectively receive photon FA and photon FB with different bases, a loss of anticorrelation between the corresponding polarization measurements occurs.

In greater detail, it is found that when the first and second photons FA and FB are received with the same bases by the first and the second communications device A and B, one of the latter will measure polarization along a direction H, while the other will measure polarization along a direction V, orthogonal to direction H. From a more quantitative standpoint, it is found that the measurement of the polarization of photon FA, by the first communications device A, causes projection of photon FB in the orthogonal state, which is subsequently analysed by the second communications device B, and vice versa. This is due to the fact that the singlet state is invariant with respect to equal rotations.

Having said that, following the generation of a certain number of entangled pairs of photons, the first and second communications devices A and B reciprocally communicate, over the conventional link CL, the bases used to measure the polarizations of the received photons. Furthermore, the first and second communications devices A and B discard, from the bits that they have determined, the bits that correspond to polarization measurements taken with different bases. Given a set of bits determined by one of the first and second communications devices A and B, the set of bits that are not discarded define a corresponding raw key.

In the example considered, the raw keys generated by the first and the second communications device A and B should each be the negation of the other, and should therefore be equal, but for a logical negation process. In the jargon, since this logical negation process is considered implicit, it is thus said that, ideally, the raw keys generated by the first and the second communications device A and B should coincide. In addition, further QKD schemes are known in which the state generated by the source S is such that, when the bases of the first and the second communications device A and B are the same, the latter measure equal polarizations and therefore no logical negation is required.

In reality, the two raw keys do not coincide, due to possible eavesdropping perpetrated by an unauthorized third party and due to the non-ideality of the quantum channel, formed by the first and the second quantum link QL_1 and QL_2, and of the communications devices involved in QKD. Therefore, after having generated the raw keys, the first and second communications devices A and B perform two further steps, which result in the generation of a single cryptographic key. These further steps of the BB84 protocol are known respectively as key reconciliation and privacy amplification and were described for the first time by C. H. Bennett, F. Bessette, G. Brassard, L. Salvail and J. Smolin in "*Experimental Quantum Cryptography*", Journal of Cryptology, vol. 5, No. 1, 1992, pp. 3-28.

In particular, in the key reconciliation step, the first and second communications devices A and B correct the errors present in the two raw keys, so as to generate a reconciled key, identical for both of them.

In detail, in the key reconciliation step, the first and second communications devices A and B exchange useful information, over the conventional link CL, for correcting the errors present in the raw keys, minimizing the information transmitted regarding each raw key.

At the end of the information reconciliation step, the first and second communications devices A and B have a same reconciled key.

Then, in the privacy amplification step, the first and second communications devices A and B generate, on the basis of the reconciled key and by means of a reciprocal authentication mechanism, a same secure key, which can eventually be used by the first and the second communications device A and B, or by the respective users, to establish a secure communications session over the conventional link CL. The described operations are then iterated, for example in a periodic manner, to determine new secure keys, for new communications sessions.

In consideration of the above at the level of principle, FIG. 2 shows a cryptographic key distribution system 10 in greater detail, which shall be referred to hereinafter as the cryptographic system 10.

In detail, the cryptographic system 10 comprises a coherent-type optical source 12, such as a laser source for example, which is able to generate electromagnetic pulses, which shall be referred to hereinafter as pump pulses. Purely by way of example, the optical source 12 could be formed by a sapphire-titanium laser operating in the mode-locked state, with a repeat rate of 76 MHz, pulse amplitude of 160 fs and a central wavelength of 830 nm, and configured such that the pump pulses are defined by the double harmonic output and therefore define an electromagnetic field having a centred spectral distribution around a wavelength of 415 nm.

The cryptographic system 10 also comprises a crystal 14, which is arranged so as to receive the pump pulses and is optically nonlinear, and therefore formed by a material having a non-centre-symmetrical crystal lattice. For example, the crystal 14 could be formed by a crystal of barium borate (BBO). Although not shown, the pump pulses can be directed onto the crystal 14 in a manner that is in itself known, for example, by opportune mirrors and/or lenses and/or waveguides.

The cryptographic system 10 further comprises a first and a second reflecting element 16 and 18, an optical trombone 19 and an optical delay line 20, a first half-wave plate 22 and a first optical beam splitter 24, as well as a beam stopper 26.

In greater detail, the beam stopper 26 is arranged facing, and aligned with, the crystal 14, so as to absorb the photons of the pump pulses that pass through the crystal 14 without having given rise to phenomena (described hereinafter) of spontaneous parametric down conversion (SPDC).

The optical delay line 20 is formed, for example, by a further optical trombone. In use, when a photon passes through it, the optical delay line 20 delays this photon by an electronically controllable time $\tau$.

In practice, the crystal 14 forms, together with the first reflecting element 16 and the optical delay line 20, a first optical path 30, which connects the crystal 14 to the first optical beam splitter 24 and is such that the first reflecting element 16 and the optical delay line 20 are interposed between the crystal 14 and the first optical beam splitter 24.

The crystal 14 also forms, together with the second reflecting element 18 and the optical trombone 19, a second optical path 32, which connects the crystal 14 to the first optical beam splitter 24 and is such that second reflecting element 18 and the optical trombone 19 are interposed between the crystal 14 and the first optical beam splitter 24.

Operationally, given a photon of a pump pulse that impinges on the crystal 14, which shall be referred to hereinafter as the pump photon, this can give rise to the phenomenon of spontaneous parametric down conversion, which is a coherent three-photon process. In particular, spontaneous parametric down conversion contemplates the annihilation of the pump photon and the consequent generation of a first and a second converted photon, which are also known as down-converted photons and, as described hereinafter, can be entangled in space-time or, equivalently, in wave number and frequency. Even more particularly, in the case of the so-called type-II spontaneous parametric down conversion, the first and second converted photons are polarized orthogonally to each other, so as to satisfy the so-called phase-matching conditions, i.e. so as to guarantee the conservation of energy and momentum.

In detail, the crystal 14 has a parallelepipedal shape and an optical axis (not shown), which is inclined by an angle C$\theta$ with respect to the pump direction DP, i.e. with respect to the direction in which the pump pulses impinge on the crystal 14. Furthermore, one of the first and second converted photons, which shall also be referred to as the ordinary photon, is polarized in a plane defined by the pump direction DP and by the direction of the so-called slow optical axis of the crystal 14. The other converted photon, which shall also be referred to as the extraordinary photon, is polarized in a perpendicular direction with respect to the pump direction DP and the direction in which the ordinary photon is polarized. It is then possible to define, for example, the above-mentioned direction H as the polarization direction of the ordinary photon, and the above-mentioned direction V as the polarization direction of the extraordinary photon.

In greater detail, as shown in FIGS. 3 and 4, the first and second converted photons are emitted, due to the conservation of momentum, along the edges of two corresponding emission cones $C_1$ and $C_2$. Therefore, as shown by way of example in FIG. 4, the transverse components, indicated as $k_{t1}$ and $k_{t2}$, of the propagation vectors of the first and the second converted photon, namely the components of these propagation vectors that lie on a plane perpendicular to the pump direction DP, lie on a same line, have a same origin, have opposite directions and the respective vertices lie along the first and the second emission cone $C_1$ and $C_2$, respectively. Always purely by way of example, FIG. 4 refers to the case where the first and second converted photons emerge from the crystal 14 to define, with respect to the pump direction DP, angles equal to +3° and −3°, respectively.

In consideration of the above, hereinafter reference is made to the so-called degenerate case, i.e. the case in which the first and second converted photons have the same frequency, equal to half the frequency of the pump photon. Furthermore, defining the first and the second lines of intersection between the first and second emission cones $C_1$ and $C_2$ as $I_1$ and $I_2$, it is assumed that the first and the second optical paths 30 and 32 are respectively arranged along the first and the second intersection lines $I_1$ and $I_2$. In this way, both the first and second converted photons can be detected along each of the first and second optical paths 30 and 32.

In other words, it can be assumed that the crystal 14 has a first and a second output, each defined by a corresponding line between the first and the second intersection lines and $I_2$. The first and the second optical path 30 and 32 respectively originate from the first and the second outputs of the crystal 14; in general, it is indifferent which one of the first and second optical paths 30 and 32 takes its origin from the first output of the crystal 14 and which one takes it from the second output. It should also be noted that the angles formed by the first and second optical paths 30 and 32 in FIG. 2 are purely qualitative.

In consideration of the above, a pair of possible states can be defined for the output from the crystal 14. In particular, it is possible to define the $|e\rangle_1|o\rangle_2$ and $|o\rangle_1|e\rangle_2$ states, where subscripts "1" and "2" respectively refer to the first and the second optical path 30 and 32, and subscripts "e" and "o" respectively refer to the extraordinary photon and the ordinary photon. In even greater detail, the state emitted from the crystal 14 can be expressed as:

$$|\psi\rangle = \frac{C}{\sqrt{2}} \int_{-L}^{0} dz \int_{0}^{+\infty} dv_p E_p^{(+)}(v_p) e^{iv_p \Lambda z} \int_{-\infty}^{\infty} dv e^{-iDvz} \times \times \Big[ \quad (1)$$

$$\hat{a}_{1e}^{\dagger}\left(v + \frac{v_p + \Omega_p}{2}\right)\hat{a}_{2o}^{\dagger}\left(-v + \frac{v_p + \Omega_p}{2}\right) -$$

$$\hat{a}_{2e}^{\dagger}\left(v + \frac{v_p + \Omega_p}{2}\right)\hat{a}_{1o}^{\dagger}\left(-v + \frac{v_p + \Omega_p}{2}\right)\Big] |0\rangle$$

where $E^+(v_p)$ represents the spectral distribution of the electromagnetic field defined by the pump pulses, this spectral distribution being centred around a central frequency $\Omega_p$. Furthermore, C is a normalization constant and L is the length of the crystal 14, measured along the pump direction DP. In addition, $\hat{a}_{1e}^{\dagger}$ and $\hat{a}_{2e}^{\dagger}$ are the creation operators related to the extraordinary photon and, respectively, to the first and the second optical paths 30 and 32; $\hat{a}_{1o}^{\dagger}$ and $\hat{a}_{2o}^{\dagger}$ are the creation operators related to the ordinary photon and, respectively, to the first and the second optical paths 30 and 32. Furthermore, the following hold:

$$\Lambda = \frac{1}{u_p} - \frac{1}{2}\left(\frac{1}{u_e} + \frac{1}{u_o}\right), \quad (2)$$

and $$D = \left(\frac{1}{u_e} - \frac{1}{u_o}\right), \quad (3)$$

where $u_p$, $u_e$ and $u_o$ are respectively the reciprocals of the group velocities in the crystal 14 of the pump photon, the extraordinary photon and the ordinary photon. Lastly, $|0\rangle$ is the vacuum state.

In practice, the extraordinary photon and the ordinary photon propagate inside the crystal 14 with different group velocities due to birefringence. Therefore, in principle, it is possible to distinguish the emissions of the first and the second converted photon, which is the equivalent of being able to discriminate between the $|e\rangle_1|o\rangle_2$ state and the $|o\rangle_1|e\rangle_2$ state. Therefore, at output from the crystal 14, the $|e\rangle_1|o\rangle_2$ and $|o\rangle_1|e\rangle_2$ states are not polarization entangled. However, by acting on an optical delay line 20, it is possible to control the state, so as to achieve indistinguishability.

Again with reference to the first optical beam splitter 24, this if of the polarizing type. In other words, given a generic photon that impinges on the first optical beam splitter 24, the first optical beam splitter 24 transmits or reflects this generic photon according to the polarization of the generic photon; for example, the first beam splitter 24 could transmit the generic photon, if it is polarized in direction H, or reflect it, if it is polarized in direction V.

In greater detail, the first optical beam splitter 24 has a first and a second input and a first and a second output. As already mentioned, the first and the second optical paths 30 and 32 are optically connected to the first optical beam splitter 24, forming precisely the first and the second input, as, in general, the term "input" implies a corresponding propagation direction of an electromagnetic signal or photon that impinges on the first optical beam splitter 24. The definition of the first and the second input of the first optical beam splitter 24 also entails the definition of the first and the second output of the first optical beam splitter 24, which imply corresponding propagation directions of the electromagnetic signal or photons that move away from the first optical beam splitter 24.

For completeness, hereinafter reference is made to the first output of the first optical beam splitter 24 to indicate the propagation direction taken by photons that impinge on the first optical beam splitter 24 after having followed the first optical path 30 and that pass through the first optical beam splitter 24 without being reflected, this propagation direction being coincident with the propagation direction of photons that impinge on the first optical beam splitter 24 after having followed the second optical path 32 and that have been reflected by it. Similarly, hereinafter reference is made to the second output of the first optical beam splitter 24 to indicate the propagation direction taken by photons that impinge on the first optical beam splitter 24 after having followed the second optical path 32 and that pass through the first optical beam splitter 24 without being reflected, this propagation direction being coincident with the propagation direction of photons that impinge on the first optical beam splitter 24 after having followed the first optical path 30 and that have been reflected by it.

The cryptographic system 10 further comprises a second and a third half-wave plate 44 and 46, a first and a second coupler 50 and 52, and a first and a second span of optical fibre 54 and 56.

In detail, the first and second couplers 50 and 52 are respectively optically connected to the first and second outputs of the first optical beam splitter 24. In addition, the first and second spans of optical fibre 54 and 56 are respectively connected to the first and second couplers 50 and 52. Thus, the photons that leave the first output of the first optical beam splitter 24 propagate in free space to a first coupler 50, which connects them to the first span of optical fibre 54. Similarly, the photons that leave the second output of the first optical beam splitter 24 propagate in free space to a second coupler 52, which connects them to the second span of optical fibre 56.

The second and the third half-wave plate 44 and 46 are respectively optically connected to the first and the second span of optical fibre 54 and 56, and therefore are respectively optically connected to the first and the second output of the first optical beam splitter 24.

Although not shown in FIG. 2, a first polarization controller may be present between the first coupler 50 and the first span of optical fibre 54, which performs the function of rendering the main optical axes of the first span of optical fibre 54 parallel to corresponding main optical axes of the first optical beam splitter 24. Similarly, a second polarization controller (not shown) may be present between the second coupler 52 and the second span of optical fibre 56, which performs the function of rendering the main optical axes of the second span of optical fibre 56 parallel to corresponding main optical axes of the first optical beam splitter 24.

The cryptographic system 10 further comprises a first and a second receiving unit RA and RB, respectively optically connected to the first and the second half-wave plate 44 and 46.

The first receiving unit RA comprises a second optical beam splitter 64, of the polarizing type and arranged so that the second half-wave plate 44 is interposed between the first span of optical fibre 54 and the second optical beam splitter 64. The second optical beam splitter 64 has a first and a second output; in addition, the second optical beam splitter 64 has a pair of main optical axes, each of which is parallel to a corresponding optical axis among the two main optical axes of the first span of optical fibre 54.

The first receiving unit RA also comprises a first and a second photodetector 70 and 72, as well as a first processing unit 74. The first and the second photodetector 70 and 72 are respectively connected to the first and the second output of the second optical beam splitter 64, so that they are able to receive photons and generate corresponding electrical signals indicative of photon reception. The first and second photodetectors 70 and 72 are also connected, in output, to the first processing unit 74, which therefore receives the electrical signals generated by them. The first and second photodetectors 70 and 72 may be Geiger-mode avalanche photodiodes, also known as single-photon avalanche photodiodes (SPAD).

In practice, given a generic photon that impinges on the second optical beam splitter 64, the second optical beam splitter 64 transmits or reflects this generic photon according to the polarization of the generic photon. Thus, detection of this incident photon occurs, if it polarized along direction H, on one of the first and second photodetectors 70 and 72, while if it polarized along direction V, it is detected by the other photodetector. Purely by way of example, hereinafter it is assumed that, if this incident photon is polarized in direction H, it is received by the first photodetector 70, and that, if this incident photon is polarized in direction V, it is received by the second photodetector 72.

The second receiving unit RB comprises a third optical beam splitter 78, of the polarizing type and arranged so that the third half-wave plate 46 is interposed between the second span of optical fibre 56 and the third optical beam splitter 78. The third optical beam splitter 78 has a first and a second output; in addition, the third optical beam splitter 78 has a pair of main optical axes, each of which is parallel to a corresponding optical axis among the two main optical axes of the second span of optical fibre 56.

The second receiving unit RB also comprises a third and a fourth photodetector 80 and 82, as well as a second processing unit 84. The third and the fourth photodetector 80 and 82 are respectively connected to the first and the second output of the third optical beam splitter 78, so that they are able to receive photons and generate corresponding electrical signals indicative of photon reception. The third and fourth photodetectors 80 and 82 are also connected, in output, to the second processing unit 84, which therefore receives the electrical signals generated by them. The third and fourth photodetectors 80 and 82 could also be, for example, Geiger-mode avalanche photodiodes.

In practice, given a generic photon that impinges on the third optical beam splitter 78, the third optical beam splitter 78 transmits or reflects this generic photon according to the polarization of the generic photon. Thus, detection of this incident photon occurs, if it polarized along direction H, on one of the third and fourth photodetectors 80 and 82, while if it polarized along direction V, it is detected by the other photodetector. Purely by way of example, hereinafter it is assumed that, if this incident photon is polarized in direction H, it is received by the third photodetector 80, and that, if this incident photon is polarized in direction V, it is received by the fourth photodetector 82.

In general, besides the spontaneous parametric down conversion process and the first half-wave plate 22, the polarization directions with which the first and the second converted photon impinge on the second and the third optical beam splitter 64 and 78 also depend on the second and the third half-wave plate 44 and 46.

In particular, the first half-wave plate 22 is oriented so as to rotate the polarization direction of any photon that passes through it by 90°.

In operation, output from the crystal 14 has the $|e\rangle_1|o\rangle_2$ and $|o\rangle_1|e\rangle_2$ states. Furthermore, it is possible to associate a corresponding two-photon wave function to each of the $|e\rangle_1|o\rangle_2$ and $|o\rangle_1|e\rangle_2$ states.

In detail, the first and the second converted photon impinge on the first optical beam splitter 24 with a same polarization direction, as the photon between them that propagates along the second optical path 32 undergoes a 90° rotation of its polarization direction, under the action of the first half-wave plate 22. Therefore, the first and the second converted photon are both reflected or transmitted by the first optical beam splitter 24.

In other words, the first half-wave plate 22 performs a temporal symmetrization of the two-photon wave function of the $|e\rangle_1|o\rangle_2$ and $|o\rangle_1|e\rangle_2$ states output from the crystal 14, transforming them in the $|e\rangle_1|e\rangle_2$ and $|o\rangle_1|o\rangle_2$ states, while the optical delay line enables totally or partially overlapping the two-photon wave functions.

The first optical beam splitter 24 therefore has a symmetrical quantum output state, which can be expressed, without normalization factors, as $|e\rangle_1|e\rangle_2+|o\rangle_1|o\rangle_2$, considering the first and the second output of the first optical beam splitter 24 as belonging to the first and the second optical paths 30 and 32, respectively.

The polarizations of the first and the second converted photon are therefore modified by the second and the third half-wave plate 44 and 46.

In greater detail, the second half-wave plate 44 forms, together with the first receiving unit RA, the first communications device (indicated herein as A1). Furthermore, the third half-wave plate 46 forms, together with the second receiving unit RB, the second communications device (indicated herein as B1).

As previously mentioned, the first and the second communications device A1 and B1 rotate the second and the third half-wave plate 44 and 46 in a pseudorandom manner, which thus form a first and a second basis. Each of the first and the second half-wave plate 44 and 46 can therefore alternatively assume a first or a second position.

In particular, the second half-wave plate 44 has a first and a second main optical axis, orthogonal to each other and also known as the fast axis and slow axis. Furthermore, the respective first and second positions are defined by the values taken by a rotation angle $\phi$.

In detail, in the first position, the second half-wave plate 44 is arranged, with respect to the second optical beam splitter 64, such that, given a generic photon that impinges on the second half-wave plate 44 with polarization parallel to the direction H, after having passed through the second half-wave plate 44, it passes through the second optical beam splitter 64. This first position corresponds, by convention, to rotation angle $\phi=0°$.

The second position of the second half-wave plate 44 is obtained by rotating the second half-wave plate 44, from the first position and around one of the two main axes, for example around the slow axis. The second half-wave plate 44 is rotated precisely by rotation angle $\phi$. For example, hereinafter it is assumed, without loss of generality, that the second position of the second half-wave plate 44 corresponds to $\phi=22.5°$. Therefore, with reference to the generic photon, when the second half-wave plate 44 is in the second position, it is reflected or passes through the second optical beam splitter 64, with equal probability.

With regard to the third half-wave plate 46, this also has a first and a second main optical axis; in addition, the respective first and second positions are defined by the values taken by a rotation angle $\theta$.

In detail, in the first position, the third half-wave plate 46 is arranged, with respect to the third optical beam splitter 78, such that, given a generic photon that impinges on the third half-wave plate 46 with polarization parallel to the direction H, after having passed through the third half-wave plate 46, it passes through the third optical beam splitter 78. This first position corresponds, by convention, to rotation angle $\theta=0°$.

The second position of the third half-wave plate 46 is obtained by rotating the third half-wave plate 46, from the first position and around one of the two main axes, for example around the slow axis. The third half-wave plate 46 is rotated precisely by rotation angle $\theta$. For example, hereinafter it is assumed, without loss of generality, that the second position of the third half-wave plate 44 corresponds to $\theta=22.5°$. Therefore, with reference to the generic photon, when the third half-wave plate 46 is in the second position, it is reflected or passes through the optical beam splitter 78, with equal probability.

In operation, given any photon that impinges on the second or the third half-wave plate 44 or 46, its polarization direction is rotated by an angle equal to $2\phi$ and $2\theta$, respectively.

In practice, for each converted pair of photons emitted from the crystal 14, the first communications device A1 sets rotation angle $\phi$ alternatively equal to 0° or 22.5°, in a pseudorandom manner independent of the second communications device B1. Similarly, for each converted pair of photons emitted from the crystal 14, the second communications device B1 sets rotation angle $\theta$ alternatively equal to 0° or 22.5°, in a pseudorandom manner independent of the first communications device A1. Therefore, with time, the values taken by rotation angle $\phi$ define a first pseudorandom sequence, while the values taken by rotation angle $\theta$ define a second pseudorandom sequence.

Given an i'th converted pair of photons, and ignoring possible losses or absorptions, one of the photons of the i'th pair is received by the first receiving unit RA, after having passed through the second half-wave plate 44, the latter being rotated such that $\phi=\phi_i$; the other photon of the i'th pair is received by the second receiving unit RB, after having passed through the third half-wave plate 46, the latter being rotated such that $\theta=\theta_i$. If $\phi_1=\theta_1$, that is to say if the first and the second basis are equal, it is found that:

the photons of the i'th pair are respectively received by the first and the third photodetector 70 and 80; or the photons of the i'th pair are respectively received by the second and the fourth photodetector 72 and 82.

Given the i'th converted pair of photons, in the case where the first and the second basis are equal, it is then found that, if the first photodetector 70 detects a photon, then the third photodetector 80 also detects a photon. Similar considerations apply to the second and the fourth photodetector 72 and 82.

Purely by way of example, the first processing unit 74 can associate a "0" bit with the detection of a photon by the first photodetector 70 and a "1" bit with the detection of a photon by the second photodetector 72. Similarly, the second processing unit 84 can associate a "0" bit with the detection of a photon by the third photodetector 80 and a "1" bit with the detection of a photon by the fourth photodetector 82.

Repeating the above-indicated operations on further pairs of converted photons, and assuming the absence of photon loss, as well as assuming that the first and the second receiving unit RA and RB are synchronized and each able to associate its own detections with the corresponding detections of the other, the first and the second processing unit 74 and 84 respectively define a first and a second bit string. By way of example, a method of synchronizing the first and the second receiving unit RA and RB is described in TO2003A000069 and in EP1730879.

Then, the first and the second processing unit 74 and 84 reciprocally communicate, for example over the conventional channel to which they are connected (not shown in FIG. 2), the first and the second pseudorandom sequence. Furthermore, the first and the second processing unit 74 and 84 determine a sequence of common bases, i.e. determine when coincidence occurs between the values of the first and the second pseudorandom sequence. In addition, given any value of the first pseudorandom sequence equal to the corresponding value of the second pseudorandom sequence, the first processing unit stores the corresponding bit it has determined; in this way, the first processing unit 74 determines a first correlated substring. Similarly, given any value of the second pseudorandom sequence equal to the corresponding value of the first pseudorandom sequence, the second processing unit 84 stores the corresponding bit it has determined; in this way, the second processing unit 84 determines a second correlated substring.

Ideally, the first and the second correlated substring are equal and form corresponding raw keys. The bits of the first bit string not included in the first correlated substring form a first uncorrelated substring; similarly, the bits of the second bit string not included in the second correlated substring form a second uncorrelated substring. The first and the second uncorrelated strings are discarded by the first and the second processing unit 74 and 84. Purely by way of example, FIG. 5 shows examples regarding the first and the second bit string, as well as the corresponding pseudorandom sequences and the corresponding first and second correlated substrings and first and second uncorrelated substrings.

Then, the first and the second processing unit 74 and 84 perform the above-mentioned key reconciliation and privacy amplification steps, on the basis of the first and the second correlated substring.

Having said that, as previously touched upon, even in the absence of eavesdropping, the first and the second correlated substring do not coincide, due to the noise that characterizes the cryptographic system 10. This noise causes the state defined by the converted pair of photons that impinge on the first and the second receiving unit RA and RB not to be a pure entangled state, but a mixture of states, which can be modelled as a pure entangled state affected by incoherency terms, i.e. by noise.

The physical phenomena that contribute to noise include, among other things, polarization-mode dispersion (PMD), which arises, for example, in the case of propagation in optical fibre, due to the birefringence of the optical fibre itself. In particular, given an optical pulse that is input into a span of optical fibre with a predetermined polarization, PMD causes a change in the polarization of the optical pulse output from the span of optical fibre, as the frequency changes. Similarly, given an optical pulse that is input into a span of optical fibre with a variable polarization, PMD causes a change in the average time delay associated with the distance travelled by the optical pulse in this span of optical fibre, as the polarization of the optical pulse changes.

In greater detail, still with reference to PMD, it is known that, given an optical fibre, a pair of main optical axes exists. These main optical axes correspond alternatively to (average) maximum or minimum time delays, and correspond to the main birefringence axes of the optical fibre. Furthermore, if a photon is sent into the optical fibre with a polarization direction parallel to one of these main optical axes, it maintains its polarization during propagation. In consideration of the above, if a polarization-entangled state is sent into this optical fibre, the entangled state will be affected by noise after propagation through the optical fibre, and in particular by so-called coloured noise, caused by the different group velocities experienced by the photons, as described for example by F. A. Bovino, G. Castagnoli, A. Cabello and A. Lamas-Linares in "Experimental noise resistant Bell inequality violations for polarization-entangled photons", Physical Review A 73: 062110 (2006).

The causes of noise also include so-called polarization dependent losses (PDL), which arise, for example, inside devices such as optical amplifiers, optical couplers, isolators, circulators, etc.

In general, similarly to what happens in the case of eavesdropping, noise causes degradation of the correlation between the first and the second correlated substring. This natural correlation degradation might be interpreted by the first and/or the second communications device A1 and B1 as eavesdropping perpetrated by a third party. This incorrect interpretation might therefore cause the adoption of protection mechanisms that are, ipso facto, not necessary, such as interrupting communications for example.

The document "Entangled State Quantum Cryptography: Eavesdropping on Ekert Protocol", by D. S. Naik et al., PHYSICAL REVIEW LETTERS, vol. 84, no. 20, pp. 4733-4736, 15 May 2000, describes an implementation of the Ekert protocol, in which the possible presence of eavesdropping is detected by checking the Bell inequalities. However, the applicant has noted that this implementation does not allow distinguishing different noise contributions that afflict a two-photon entangled state.

DISCLOSURE OF INVENTION

The object of the present invention is therefore that of providing a method for estimating the noise of a two-photon entangled state that at least partially resolves the drawbacks of the known art.

In accordance with the invention, a method and system for estimating the noise of a two-photon entangled state are provided, as defined in the appended claims.

BRIEF DESCRIPTION OF THE DRAWINGS

For a better understanding of the invention, some embodiments will now be described, purely by way of a non-limitative example and with reference to the attached drawings, where:

FIG. 1 shows a schematic block diagram of a cryptographic key distribution system;

FIG. 2 shows a block diagram of a cryptographic key distribution system of known type;

BEST MODE FOR CARRYING OUT THE INVENTION

Figure 6:
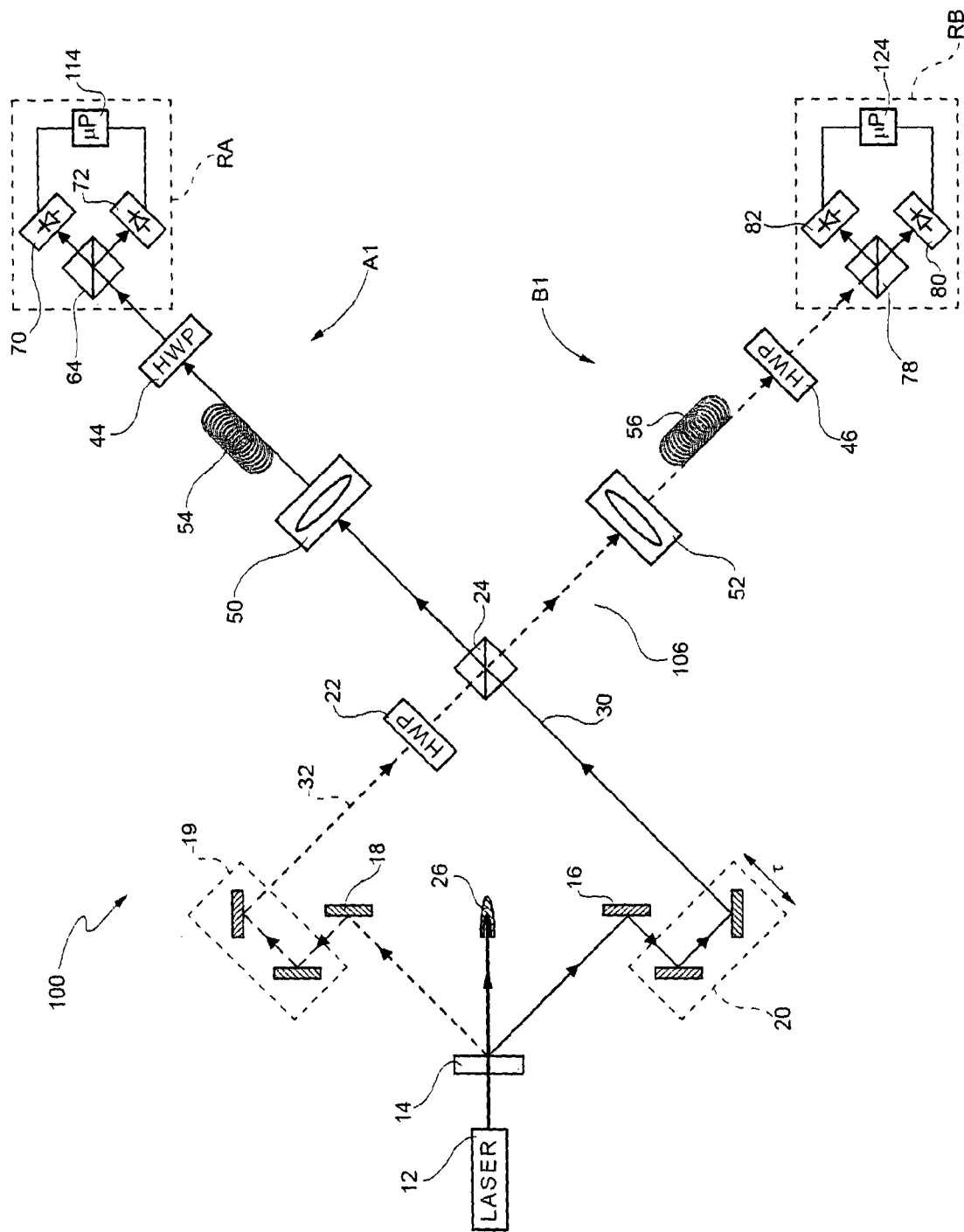
FIG. 6 shows a block diagram of a noise estimating system according to the present invention.

FIG. 6 shows a noise estimating system 100, which shall be referred to hereinafter as the estimating system 100. Except where specified otherwise, elements of the estimating system 100 already present in the cryptographic system 10 are indicated with the same reference numerals. Furthermore, the present description of the estimating system 100 is limited to the differences of the latter with respect to the cryptographic system 10.

In particular, the estimating system 100 comprises the first and the second processing unit, indicated here as 114 and 124, respectively, the operation of which is described hereinafter.

Before describing the operation of the estimating system 100, it is opportune to note that the output state of the first optical beam splitter 24 can be expressed as:

$$|\psi\rangle = \frac{C}{\sqrt{2}} \int_{-L}^{0} dz \int_{0}^{+\infty} dv_p E_p^{(+)}(v_p) e^{iv_p \Lambda z} \quad (4)$$

$$\int_{-\infty}^{\infty} dv e^{-iDvz} \times \times \left[ \hat{a}_{1o}^{\dagger}\left(-v + \frac{v_p + \Omega_p}{2}\right) \hat{a}_{2o}^{\dagger}\left(v + \frac{v_p + \Omega_p}{2}\right) \right.$$

$$\hat{a}_{2o}^{\dagger}\left(v + \frac{v_p + \Omega_p}{2}\right) e^{-i\left(v + \frac{v_p + \Omega_p}{2}\right)\tau} +$$

-continued $$\hat{a}_{1e}^{\dagger}\left(v+\frac{v_p+\Omega_p}{2}\right)e^{-i\left(v+\frac{v_p+\Omega_p}{2}\right)\tau}$$

$$\hat{a}_{2e}^{\dagger}\left(-v+\frac{v_p+\Omega_p}{2}\right)\right]\left|0\right\rangle$$

where $\tau$ is the time delay introduced by the optical delay line 20.

By tracing all the different degrees of freedom of the polarization, it is then possible to calculate the density matrix related to the output from the first optical beam splitter 24. In particular, this density matrix can be expressed as:

$$\rho_{cn} = \begin{pmatrix} \frac{1}{2} & 0 & 0 & \frac{1}{2}F(\tau) \\ 0 & 0 & 0 & 0 \\ 0 & 0 & 0 & 0 \\ \frac{1}{2}F(\tau) & 0 & 0 & \frac{1}{2} \end{pmatrix} = \quad (5)$$

$$F(\tau)\begin{pmatrix} \frac{1}{2} & 0 & 0 & \frac{1}{2} \\ 0 & 0 & 0 & 0 \\ 0 & 0 & 0 & 0 \\ \frac{1}{2} & 0 & 0 & \frac{1}{2} \end{pmatrix} + \frac{1-F(\tau)}{2}\begin{pmatrix} 1 & 0 & 0 & 0 \\ 0 & 0 & 0 & 0 \\ 0 & 0 & 0 & 0 \\ 0 & 0 & 0 & 1 \end{pmatrix},$$

or, equivalently, as:

$$\rho_{cn} = F(\tau)|\Phi^+\rangle\langle\Phi^+| + \frac{1-F(\tau)}{2}(|o_1\rangle|o_2\rangle \quad (6)$$

$$\langle o_2|\langle o_1| + |e_1\rangle|e_2\rangle\langle e_2|\langle e_1|),$$

where $|\Phi^+\rangle\langle\Phi^+|$ is the density matrix of the Bell state ideally output from the first optical beam splitter 24, and where:

$$F(\tau) = Rect\left(\frac{\tau}{DL}\right)\left(1-2\left|\frac{\tau}{DL}\right|\right) \quad (7)$$

and $$Rect\left(\frac{\tau}{DL}\right) = \begin{cases} 1 & \text{for } \left|\frac{\tau}{DL}\right| \leq \frac{1}{2} \\ 0 & \text{altrimen otherwise} \end{cases} \quad (8)$$

In practice, the density matrix referred to in equation (5) describes a state affected by a coloured noise contribution, namely a mostly entangled state upon which an incoherency term is superimposed. Moreover, it can be deduced that this coloured noise depends on the delay $\tau$ introduced by the optical delay line 20. In particular, when $\tau=0$, and ignoring the polarization-mode dispersion caused by the first and second spans of optical fibre 54 and 56, $F(\tau)=0$ is obtained, and so indistinguishability between emission of the extraordinary photon and emission of the ordinary photon is obtained. Therefore, with $\tau=0$ the so-called pure state is achieved. In other words, coloured noise is indicative of the temporal distinguishability between two possible alternatives of the output state of the first optical beam splitter 24, upstream of the first and the second receiving unit RA and RB. For example, the coloured noise is caused by the polarization-mode dispersion introduced by the portion of the noise estimating system 100 arranged upstream of the first and the second receiving unit RA and RB.

In greater detail, the equations (1-8) refer to a dual-mode approximation of the state generated by the crystal 14, this approximation being related to the longitudinal components of the electromagnetic fields involved in the spontaneous parametric down conversion process. By also considering the transversal components of the electromagnetic fields involved in the spontaneous parametric down conversion process, it is possible to consider a further noise contribution, which shall be referred to as noise caused by imbalance. The noise caused by imbalance is due to possible misalignments between the first and second optical paths 30 and 32 and the first, second, third and fourth photodetectors 70, 72, 80 and 82. Noise caused by imbalance is thus caused, for example, by a difference between the alignment of the first optical path 30 and the first communications device A1 (in particular, the first receiving unit RA), and the alignment between the second optical path 32 and the second communications device A2 (in particular, the second receiving unit RB). Similarly, the noise caused by imbalance can be produced by a difference between the polarization dependent losses that afflict the first and the second optical paths 30 and 32.

As a consequence, and ignoring any polarization-dependent losses, the output state of the first optical beam splitter 24 can be expressed as:

$$|\psi\rangle = \frac{C}{\sqrt{2}}\int_{-L}^{0}dz\int_{0}^{+\infty}dv_p E_p^{(+)}(v_p)e^{iv_p\Lambda z} \quad (9)$$

$$\int_{-\infty}^{+\infty}dv e^{-iDvz} \times \times \begin{bmatrix} \cos(\gamma)\hat{a}_{1o}^{\dagger}\left(-v+\frac{v_p+\Omega_p}{2}\right)\hat{a}_{2o}^{\dagger}\left(v+\frac{v_p+\Omega_p}{2}\right)e^{i\left(-v+\frac{v_p+\Omega_p}{2}\right)\tau} + \\ \sin(\gamma)\hat{a}_{1e}^{\dagger}\left(v+\frac{v_p+\Omega_p}{2}\right)\hat{a}_{2e}^{\dagger}\left(-v+\frac{v_p+\Omega_p}{2}\right)e^{i\left(-v+\frac{v_p+\Omega_p}{2}\right)\tau} \end{bmatrix}|0\rangle$$

where $\gamma$ is a term related precisely to the noise caused by imbalance. Furthermore, the density matrix can be expressed as:

$$\rho_{rumes}(\gamma,\tau) = \begin{pmatrix} \cos^2(\gamma) & 0 & 0 & \frac{\sin(2\gamma)}{2}F(\tau) \\ 0 & 0 & 0 & 0 \\ 0 & 0 & 0 & 0 \\ \frac{\sin(2\gamma)}{2}F(\tau) & 0 & 0 & \sin^2(\gamma) \end{pmatrix} \quad (10)$$

In the absence of coloured noise, i.e. when τ=0, the density matrix assumes the form of a so-called non-maximally entangled state.

It is also possible to consider a further noise contribution, which shall be referred to as white noise. White noise is indicative of eavesdropping, or is caused by external light that couples with the first and the second optical paths 30 and 32 in an unwanted manner and influences the measurements of the first, second, third and fourth photodetectors 70, 72, 80 and 82. In this case, the density matrix becomes:

$$\rho(p, \gamma, \tau) = p\rho_{runes}(\gamma, \tau) + \frac{1-p}{4}I \quad (11)$$

where I indicates the 4×4 identity matrix. This gives:

$$\rho(p, \gamma, \tau) = \begin{pmatrix} \frac{1-p}{4} + p\cos^2(\gamma) & 0 & 0 & p\frac{\sin(2\gamma)}{2}F(\tau) \\ 0 & \frac{1-p}{4} & 0 & 0 \\ 0 & 0 & \frac{1-p}{4} & 0 \\ p\frac{\sin(2\gamma)}{2}F(\tau) & 0 & 0 & \frac{1-p}{4} + p\sin^2(\gamma) \end{pmatrix} \quad (12)$$

In general, the output state of the first optical beam splitter 24 can be characterized, in terms of mixture, by the so-called linear entropy SL(p, γ, τ), which is given by:

$$SL(p, \gamma, \tau) = \frac{1}{3}[3 - 3p^2 + 2p^2\sin^2(2\gamma)(1 - F^2(\tau))] \quad (13)$$

The output state of the first optical beam splitter 24 can also be characterized in terms of entanglement, by the so-called concurrence C(p, γ, τ), which is given by:

$$C(p, \gamma, \tau) = \max\left[\frac{1}{2}[p - 1 + 2p\sin(2\gamma)F(\tau)], 0\right] \quad (14)$$

Figure 7:
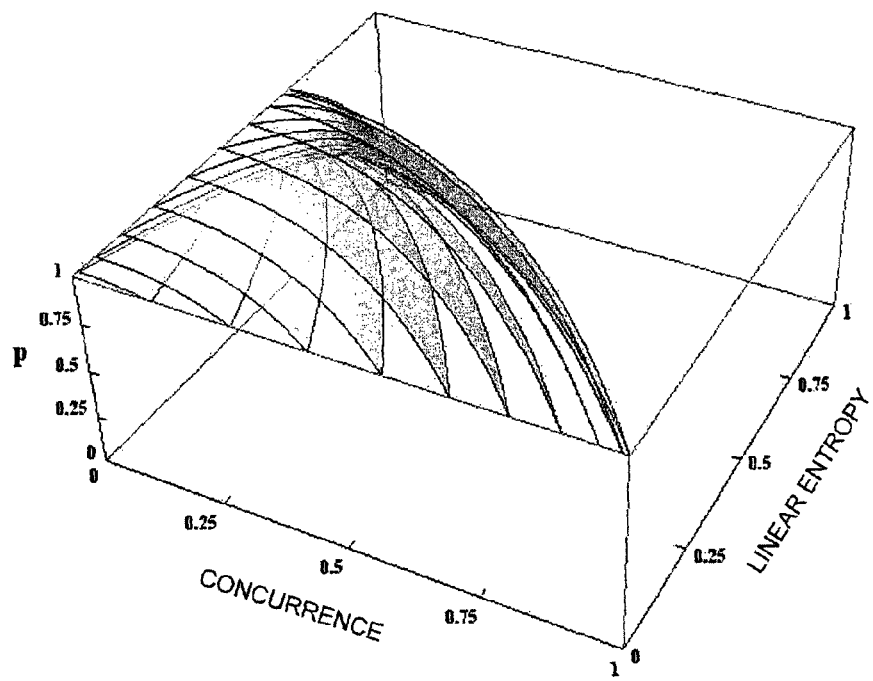
FIGS. 7 and 8 depict surfaces that describe the characteristics of a state.
Figure 8:
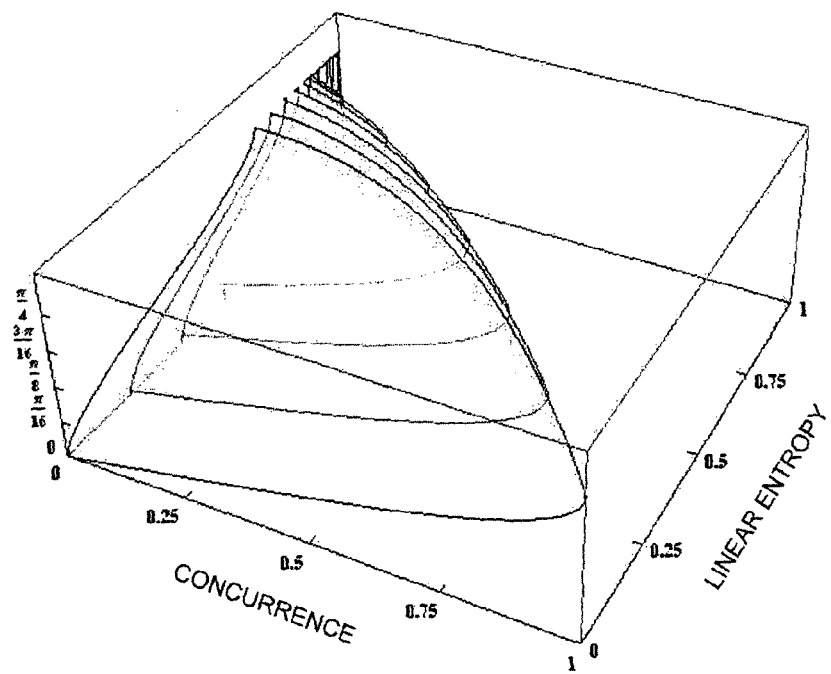

Purely by way of example, FIGS. 7 and 8 show an example of the behaviour of the output state of the first optical beam splitter 24, as the values of γ and p change. In particular, FIG. 7 shows surfaces that describe the characteristics of the state as a function of p, of the concurrence C and of the linear entropy SL, parameterized with respect to γ, while FIG. 8 shows surfaces that describe the characteristics of the state as a function of γ, of the concurrence C and of the linear entropy SL, parameterized with respect to p.

It is also possible to calculate the reduced density matrix for the first and the second communications device A1 and B1, this matrix being expressible as:

$$\rho_{A(B)} = Tr_{B(A)}[\rho] = \begin{pmatrix} \frac{1-p}{2} + p\cos^2(\gamma) & 0 \\ 0 & \frac{1-p}{2} + p\sin^2(\gamma) \end{pmatrix} \quad (15)$$

It is therefore possible to define the following polarization projection operators:

$$U_{A+}(\varphi) = \begin{pmatrix} \cos^2(2\varphi) & \frac{1}{2}\sin(4\varphi) \\ \frac{1}{2}\sin(4\varphi) & \sin^2(2\varphi) \end{pmatrix} \quad (16)$$

$$U_{A-}(\varphi) = \begin{pmatrix} \sin^2(2\varphi) & -\frac{1}{2}\sin(4\varphi) \\ -\frac{1}{2}\sin(4\varphi) & \cos^2(2\varphi) \end{pmatrix}$$

$$U_{B+}(\vartheta) = \begin{pmatrix} \cos^2(2\vartheta) & \frac{1}{2}\sin(4\vartheta) \\ \frac{1}{2}\sin(4\vartheta) & \sin^2(2\vartheta) \end{pmatrix}$$

$$U_{B-}(\vartheta) = \begin{pmatrix} \sin^2(2\vartheta) & -\frac{1}{2}\sin(4\vartheta) \\ -\frac{1}{2}\sin(4\vartheta) & \cos^2(2\vartheta) \end{pmatrix}$$

where the subscripts A+, A−, B+ and B− respectively indicate the first, second, third and fourth photodetectors 70, 72, 80 and 82.

Indicating the quantum efficiencies of the first, second, third and fourth photodetectors 70, 72, 80 and 82 as $\eta_{A+}$, $\eta_{A-}$, $\eta_{B+}$ and $\eta_{B-}$, the predictions of the four probabilities of single detection by the first, second, third and fourth photodetectors 70, 72, 80 and 82 are given by:

$$PCh_{A+}(\varphi) = Tr[\rho_A \eta_{A+} U_{A+}(\varphi)] = \frac{\eta_{A+}}{2}[1 + p\cos(2\gamma)\cos(4\varphi)] \quad (17)$$

$$PCh_{A-}(\varphi) = Tr[\rho_A \eta_{A-} U_{A-}(\varphi)] = \frac{\eta_{A-}}{2}[1 - p\cos(2\gamma)\cos(4\varphi)]$$

$$PCh_{B+}(\vartheta) = Tr[\rho_B \eta_{B+} U_{B+}(\vartheta)] = \frac{\eta_{B+}}{2}[1 + p\cos(2\gamma)\cos(4\vartheta)]$$

$$PCh_{B-}(\vartheta) = Tr[\rho_B \eta_{B-} U_{B-}(\vartheta)] = \frac{\eta_{B-}}{2}[1 - p\cos(2\gamma)\cos(4\vartheta)]$$

where $\rho_A$ indicates precisely the reduced density matrix for the first and the second communications device A1 and B1.

In the case where φ=θ=π/8, this gives:

$$PCh_{A+}\left(\frac{\pi}{8}\right) = \frac{\eta_{A+}}{2} \quad (18)$$

$$PCh_{A-}\left(\frac{\pi}{8}\right) = \frac{\eta_{A-}}{2}$$

$$PCh_{B+}\left(\frac{\pi}{8}\right) = \frac{\eta_{B+}}{2}$$

$$PCh_{B-}\left(\frac{\pi}{8}\right) = \frac{\eta_{B-}}{2}$$

It is also possible to express the number of photon detections, i.e. single count, by the first, second, third and fourth photodetectors 70, 72, 80 and 82, respectively, as:

$$Ch_{A+}(\varphi) = R\frac{\eta_{A+}}{2}[1 + p\cos(2\gamma)\cos(4\varphi)] \quad (19)$$

$$Ch_{A-}(\varphi) = R\frac{\eta_{A-}}{2}[1 - p\cos(2\gamma)\cos(4\varphi)]$$

$$Ch_{B+}(\vartheta) = R\frac{\eta_{B+}}{2}[1 + p\cos(2\gamma)\cos(4\vartheta)]$$

-continued $$Ch_{B-}(\vartheta) = R\frac{\eta_{B-}}{2}[1 - pCos(2\gamma)Cos(4\vartheta)]$$

where R represents the number of two-photon states generated; on this point, it should be noted that the number of generated two-photon states R, and consequently also the single counts referred to in equations (19), depend on an observation period, namely the period of time in which the first, second, third and fourth photodetectors 70, 72, 80 and 82 have detected the arrival of photons, determining the first and the second bit string. In general, hereinafter this dependency on the observation period is implied.

In consideration of the above, this gives:

$$Ch_{A+}\left(\frac{\pi}{8}\right) = R\frac{\eta_{A+}}{2} \quad (20)$$

$$Ch_{A-}\left(\frac{\pi}{8}\right) = R\frac{\eta_{A-}}{2}$$

$$Ch_{B+}\left(\frac{\pi}{8}\right) = R\frac{\eta_{B+}}{2}$$

$$Ch_{B-}\left(\frac{\pi}{8}\right) = R\frac{\eta_{B-}}{2}$$

It is also possible to express the probabilities of coincidence detection by pairs of photodetectors as:

$$PC_{A+B+}(\phi,\theta) = Tr[\rho\eta_{A+}U_{A+}(\phi) \otimes \eta_{B+}U_{B+}(\theta)]$$

$$PC_{A-B-}(\phi,\theta) = Tr[\rho\eta_{A-}U_{A-}(\phi) \otimes \eta_{B-}U_{B-}(\theta)]$$

$$PC_{A+B-}(\phi,\theta) = Tr[\rho\eta_{A+}U_{A+}(\phi) \otimes \eta_{B-}U_{B-}(\theta)]$$

$$PC_{A-B+}(\phi,\theta) = Tr[\rho\eta_{A-}U_{A-}(\phi) \otimes \eta_{B+}U_{B+}(\theta)] \quad (21)$$

where the subscripts A+B+, A−B−, A+B− and A−B+ indicate the pairs formed respectively by the first and the third photodetector, by the second and the fourth photodetector, by the first and the fourth photodetector, and by the second and the third photodetector. In practice, $PC_{A+B+}$ indicates the probability that, given a converted pair of photons, detection of the arrival of a photon by both the first and the third photodetector 70 and 80 occurs. Similarly, $PC_{A+B-}$, $PC_{A-B+}$ and $PC_{A-B-}$ respectively indicate the probabilities that coincidence occurs between the photon detections i) of the first and the fourth photodetector 70 and 82, ii) of the second and the third photodetector 72 and 80, and iii) of the second and the fourth photodetector 72 and 80.

It is also possible to express the number of coincident photon detections, i.e. the coincidence counts (these also relative to the observation period), of pairs, of photodetectors as:

$$C_{A+B+}(\phi,\theta) = RTr[\rho\eta_{A+}U_{A+}(\phi) \otimes \eta_{B+}U_{B+}(\theta)]$$

$$C_{A-B-}(\phi,\theta) = RTr[\rho\eta_{A-}U_{A-}(\phi) \otimes \eta_{B-}U_{B-}(\theta)]$$

$$C_{A+B-}(\phi,\theta) = RTr[\rho\eta_{A+}U_{A+}(\phi) \otimes \eta_{B-}U_{B-}(\theta)]$$

$$C_{A-B+}(\phi,\theta) = RTr[\rho\eta_{A-}U_{A-}(\phi) \otimes \eta_{B+}U_{B+}(\theta)] \quad (22)$$

Normalizing the probabilities of coincidence detection referred to in equations (21) with respect to the quantum efficiencies $\eta_{A+}$, $\eta_{A-}$, $\eta_{B+}$, $\eta_{B-}$, gives:

$$NPC_{A+B+}(\varphi,\vartheta) = \frac{PC_{A+B+}(\varphi,\vartheta)}{4PCh_{A+}\left(\frac{\pi}{8}\right)PCh_{B+}\left(\frac{\pi}{8}\right)} \quad (23)$$

$$NPC_{A-B-}(\varphi,\vartheta) = \frac{PC_{A-B-}(\varphi,\vartheta)}{4PCh_{A-}\left(\frac{\pi}{8}\right)PCh_{B-}\left(\frac{\pi}{8}\right)}$$

$$NPC_{A+B-}(\varphi,\vartheta) = \frac{PC_{A+B-}(\varphi,\vartheta)}{4PCh_{A+}\left(\frac{\pi}{8}\right)PCh_{B-}\left(\frac{\pi}{8}\right)}$$

$$NPC_{A-B+}(\varphi,\vartheta) = \frac{PC_{A-B+}(\varphi,\vartheta)}{4PCh_{A-}\left(\frac{\pi}{8}\right)PCh_{B+}\left(\frac{\pi}{8}\right)}$$

Furthermore, normalizing the coincidence counts referred to in equations (22) with respect to the quantum efficiencies $\eta_{A+}$, $\eta_{A-}$, $\eta_{B+}$, $\eta_{B-}$ and the number R of two-photon states generated gives:

$$N1C_{A+B+}(\varphi,\vartheta) = \frac{C_{A+B+}(\varphi,\vartheta)}{4Ch_{A+}\left(\frac{\pi}{8}\right)Ch_{B+}\left(\frac{\pi}{8}\right)} \quad (24)$$

$$= \frac{R * PC_{A+B+}(\varphi,\vartheta)}{4R^2 * PCh_{A+}\left(\frac{\pi}{8}\right)PCh_{B+}\left(\frac{\pi}{8}\right)}$$

$$N1C_{A-B-}(\varphi,\vartheta) = \frac{PC_{A-B-}(\varphi,\vartheta)}{4Ch_{A-}\left(\frac{\pi}{8}\right)Ch_{B-}\left(\frac{\pi}{8}\right)}$$

$$= \frac{RPC_{A-B-}(\varphi,\vartheta)}{4R^2 * PCh_{A-}\left(\frac{\pi}{8}\right)PCh_{B-}\left(\frac{\pi}{8}\right)}$$

$$N1C_{A+B-}(\varphi,\vartheta) = \frac{C_{A+B-}(\varphi,\vartheta)}{4PCh_{A+}\left(\frac{\pi}{8}\right)PCh_{B-}\left(\frac{\pi}{8}\right)}$$

$$= \frac{RPC_{A+B-}(\varphi,\vartheta)}{4R^2 * PCh_{A+}\left(\frac{\pi}{8}\right)PCh_{B-}\left(\frac{\pi}{8}\right)}$$

$$N1PC_{A-B+}(\varphi,\vartheta) = \frac{PC_{A-B+}(\varphi,\vartheta)}{4Ch_{A-}\left(\frac{\pi}{8}\right)Ch_{B+}\left(\frac{\pi}{8}\right)}$$

$$= \frac{RPC_{A-B+}(\varphi,\vartheta)}{4R^2 * PCh_{A-}\left(\frac{\pi}{8}\right)PCh_{B+}\left(\frac{\pi}{8}\right)}$$

from which it can be deduced that these normalized coincidence counts are normalized precisely by using the single counts, namely the numbers of photon detections by the first, the second, the third and the fourth photodetector considered individually, and regarding the case where $\theta=\phi=\pi/8$.

The following relation also holds:

$$NPC_{A+B+}(\phi,\theta) + NPC_{A-B-}(\phi,\theta) + NPC_{A+B-}(\phi,\theta) + NPC_{A-B+}(\phi,\theta) = 1 \quad (25)$$

Therefore, the following relation holds:

$$\frac{\frac{PC_{A+B+}}{R*\eta_{A+}\eta_{B+}}}{\frac{PC_{A+B+}}{R*\eta_{A+}\eta_{B+}} + \frac{PC_{A-B-}}{R*\eta_{A-}\eta_{B-}} + \frac{PC_{A+B-}}{R*\eta_{A+}\eta_{B-}} + \frac{PC_{A-B+}}{R*\eta_{A-}\eta_{B+}}} = \quad (26)$$

$$\frac{\frac{PC_{A+B+}}{\eta_{A+}\eta_{B+}}}{\frac{PC_{A+B+}}{\eta_{A+}\eta_{B+}} + \frac{PC_{A-B-}}{\eta_{A-}\eta_{B-}} + \frac{PC_{A+B-}}{\eta_{A+}\eta_{B-}} + \frac{PC_{A-B+}}{\eta_{A-}\eta_{B+}}} =$$

-continued $$\frac{NPC_{A+B+}}{NPC_{A+B+} + NPC_{A-B-} + NPC_{A+B-} + NPC_{A-B+}} = NPC_{A+B+}$$

It is therefore possible to determine the normalized probabilities (i.e. independent of the number R of two-photon states generated and the quantum efficiencies) of coincidence detection by pairs of photodetectors, on the basis of the normalized coincidence counts referred to in equations (24). In particular, the following relations hold:

$$NPC_{A+B+} = \frac{N1C_{A+B+}}{N1C_{A+B+} + N1C_{A-B-} + N1C_{A+B-} + N1C_{A-B+}} \quad (27)$$

$$NPC_{A-B-} = \frac{N1C_{A-B-}}{N1C_{A+B+} + N1C_{A-B-} + N1C_{A+B-} + N1C_{A-B+}}$$

$$NPC_{A+B-} = \frac{N1C_{A+B-}}{N1C_{A+B+} + N1C_{A-B-} + N1C_{A+B-} + N1C_{A-B+}}$$

$$NPC_{A-B+} = \frac{N1C_{A-B+}}{N1C_{A+B+} + N1C_{A-B-} + N1C_{A+B-} + N1C_{A-B+}}$$

where specification of the dependence on ($\phi$, $\theta$) has been omitted for clarity.

It is also possible to express, on the basis of the normalized probabilities of coincidence detection $NPC_{A+B+}$, $NPC_{A-B-}$, $NPC_{A+B-}$ and $NPC_{A-B+}$, the following two-qubit Stokes parameters:

$$S00(0, 0) = NPC_{A+B+} + NPC_{A-B-} + NPC_{A+B-} + NPC_{A-B+} \quad (28)$$
$$= 1$$

$$S03(0, 0) = NPC_{A+B+} - NPC_{A-B-} - NPC_{A+B-} + NPC_{A-B+}$$
$$= p\cos(2\gamma)$$

$$S30(0, 0) = NPC_{A+B+} - NPC_{A-B-} + NPC_{A+B-} - NPC_{A-B+}$$
$$= p\cos(2\gamma)$$

$$S33(0, 0) = NPC_{A+B+} + NPC_{A-B-} - NPC_{A+B-} - NPC_{A-B+}$$
$$= p$$

$$S11\left(\frac{\pi}{8}, \frac{\pi}{8}\right) = NPC_{A+B+} + NPC_{A-B-} - NPC_{A+B-} - NPC_{A-B+}$$
$$= p\sin(\gamma)F(\tau)$$

where the Sxy($\phi$, $\theta$) notation has been adopted, with integer values for both x and y in the range 0 to 3; furthermore, x and y respectively indicate the Pauli matrices $\sigma_x$ and $\sigma_y$.

In consideration of the above, the applicant has observed that in order to determine the noise contributions that characterize the output state of the first optical beam splitter 24, it is possible to make use of measurements that are, ipso facto, available during a cryptographic key distribution process of the type described with reference to the cryptographic system 10. It is therefore possible to determine the noise contributions, having only the rotation angles $\phi$ and $\theta$ of the second and the third half-wave plate 44 and 46 as the degrees of freedom.

More specifically, on the basis of the normalized probabilities of coincidence detection $NPC_{A+B+}$, $NPC_{A-B-}$, $NPC_{A+B-}$ and $NPC_{A-B+}$, it is possible to define a first and a second additional parameter:

$$NS01(0,\pi/8) = NPC_{A+B+}(0,\pi/8) - NPC_{A-B-}(0,\pi/8) + NPC_{A+B-}(0,\pi/8) - NPC_{A-B+}(0,\pi/8) = p^*\cos(2\gamma) \quad (29)$$

$$NS10(\pi/8,0) = NPC_{A+B+}(\pi/8,0) + NPC_{A-B-}(\pi/8,0) - NPC_{A+B-}(\pi/8,0) - NPC_{A-B+}(\pi/8,0) = p^*\cos(2\gamma) \quad (30)$$

where the NS01($\phi$, $\theta$) and NS10($\phi$, $\theta$) notation is used.

In consideration of the above, the first and the second processing unit 114 and 124 exchange, for example over the conventional link CL, the first and the second uncorrelated substring.

Furthermore, the first processing unit 114 communicates the number of photons detected by the first photodetector 70 with $\phi=\pi/8$ (i.e. $Ch_{A+}(\pi/8)$), as well as the number of photons detected by the second photodetector 72 with $\phi=\pi/8$ (i.e. $Ch_{A-}(\pi/8)$), to the second processing unit 124. In practice, the first processing unit 114 communicates the total number of "0" bits and the total number of "1" bits of the first bit string, as determined with $\phi=\pi/8$. With reference, purely by way of example, to the examples shown in FIG. 5, this would give $Ch_{A+}(\pi/8)=4$ and $Ch_{A-}(\pi/8)=1$. Transmission takes place in encrypted mode over the conventional link CL, for example using a portion of a reconciled key obtained in a previous QKD session, or by means of an initial authentication key known to the first and the second processing unit 114 and 124. In this connection, in a manner which is in itself known, before performing the QKD process for the first time (for example, after a start-up step), each of the first and the second processing unit 114 and 124 has a respective authentication key.

Similarly, the second processing unit 124 communicates the number of photons detected by the third photodetector 80 with $\theta=\pi/8$ (i.e. $Ch_{B+}(\pi/8)$), as well as the number of photons detected by the fourth photodetector 82 with $\theta=\pi/8$ (i.e. $Ch_{B-}(\pi/8)$), to the first processing unit 114. In practice, the second processing unit 124 communicates the total number of "0" bits and the total number of "1" bits of the second bit string, as determined with $\theta=\pi/8$. With reference, purely by way of example, to the examples shown in FIG. 5, this would give $Ch_{B+}(\pi/8)=3$ and $Ch_{B-}(\pi/8)=2$. Transmission takes place in encrypted mode over the conventional link CL, for example using a portion of a reconciled key obtained in a previous QKD session, or by means of an initial authentication key known to the first and the second processing unit 114 and 124.

Each of the first and the second processing unit 114 and 124 then performs the following operations:
- selects the bits of the first uncorrelated substring determined with $\phi=0$, forming a first elementary substring;
- selects the bits of the second uncorrelated substring determined with $\theta=\pi/8$, forming a second elementary substring; and
- calculates the normalized coincidence counts $N1CC1_{A+B+}$, $N1CC1_{A-B-}$, $N1CC1_{A+B-}$ and $N1CC1_{A-B+}$, on the basis of the first and the second elementary substring.

In particular, this gives that:
$N1CC1_{A+B+}$ is equal to the ratio between the number of times when, given a mutually corresponding (i.e. regarding a same converted pair of photons) first bit and second bit of the first and the second elementary substring, respectively, the first bit and the second bit are both equal to "0", and the product $4*Ch_{A+}(\pi/8)*Ch_{B+}(\pi/8)$;

$N1CC1_{A+B-}$ is equal to the ratio between the number of times when, again given the above-mentioned first and second bits, the first bit is equal to "0" and the second bit is equal to "1", and the product $4*Ch_{A+}(\pi/8)*Ch_{B-}(\pi/8)$;

$N1CC1_{A-B-}$ is equal to the ratio between the number of times when, given the above-mentioned first and second bits, the first bit is equal to "1" and the second bit is equal to "0", and the product $4*Ch_{A-}(\pi/8)*Ch_{B+}(\pi/8)$; and N1CC1$_{A-B-}$ is equal to the ratio between the number of times when, given the above-mentioned first and second bits, the first and the second are both equal to "1", and the product 4*Ch$_{A-}$(π/8)*Ch$_{B-}$(π/8).

Figure 3:
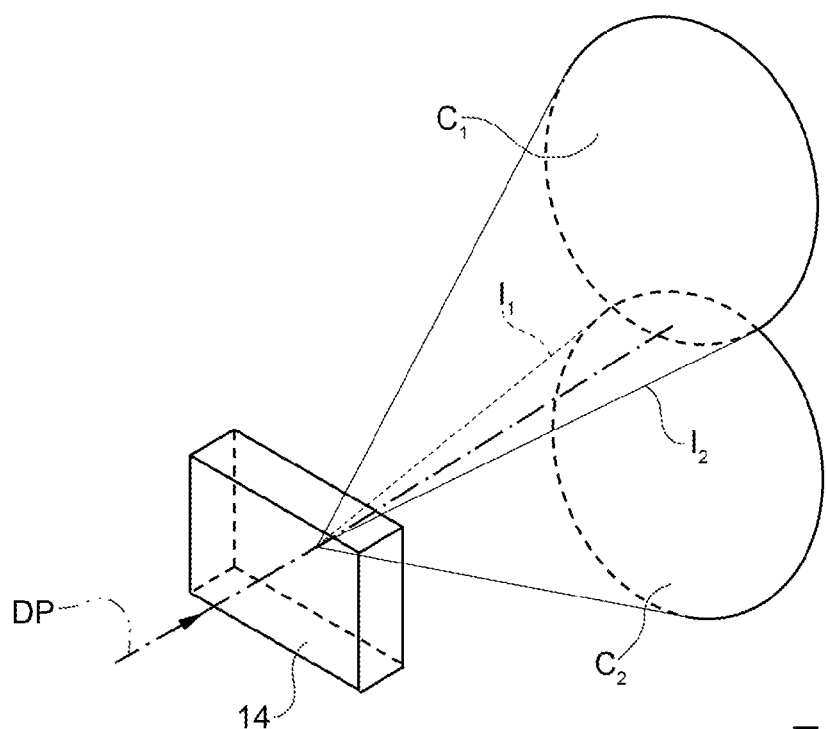
FIG. 3 schematically shows a perspective view of a crystal of the cryptographic key distribution system shown in FIG. 2, and of two emission cones, related to an extraordinary photon and an ordinary photon.
Figure 4:
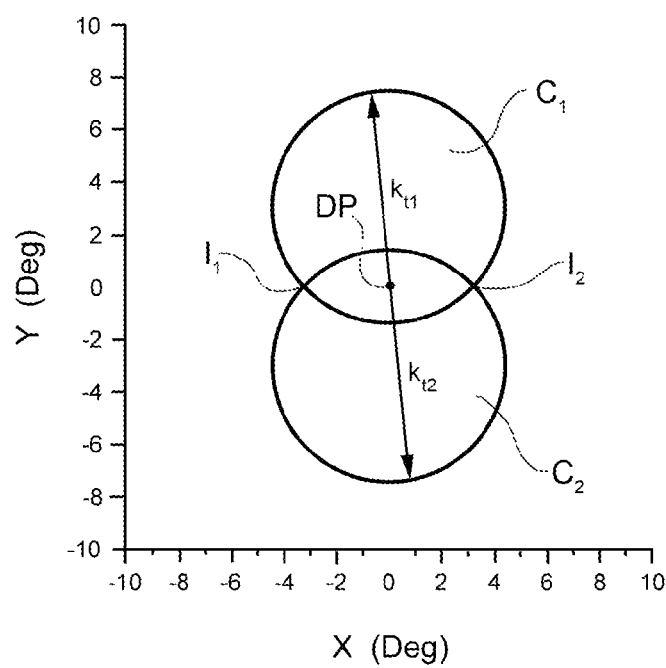
FIG. 4 schematically shows a spatial distribution of possible transversal components of the propagation vectors of the extraordinary photon and the ordinary photon.
Figure 5:
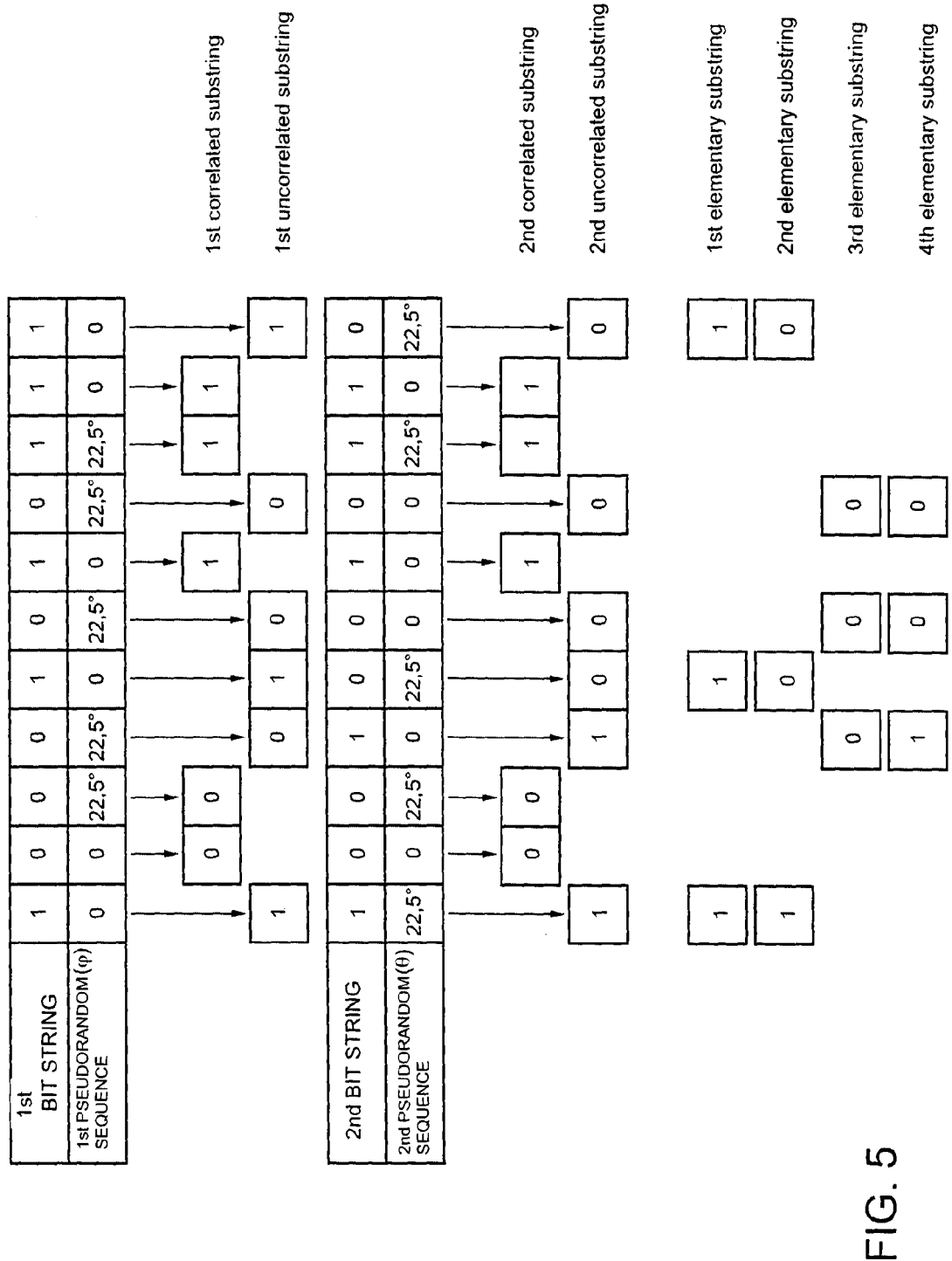
FIG. 5 shows examples of bit strings and substrings, as well as the corresponding basic pseudorandom sequences.

Examples regarding the first and the second elementary substring are shown in FIG. 5.

Each of the first and the second processing unit 114 and 124 also performs the following operations:
  selects the bits of the first uncorrelated substring determined with (φ=π/8, forming a third elementary substring;
  selects the bits of the second uncorrelated substring determined with θ=0°, forming a fourth elementary substring;
  calculates the normalized coincidence counts N1CC2$_{A+B+}$, N1CC2$_{A-B-}$, N1CC2$_{A+B-}$ and N1CC2$_{A-B+}$, on the basis of the third and the fourth elementary substring.

In particular, this gives that:
  N1CC2$_{A+B+}$ is equal to the ratio between the number of times when, given a mutually corresponding (i.e. regarding a same converted pair of photons) first bit and second bit of the third and the fourth elementary substring, respectively, the first bit and the second bit are both equal to "0", and the product 4*Ch$_{A+}$(π/8)*Ch$_{B+}$(π/8);
  N1CC2$_{A+B-}$ is equal to the ratio between the number of times when, again given the above-mentioned first and second bits, the first bit is equal to "0" and the second bit is equal to "1", and the product 4*Ch$_{A+}$(π/8)*Ch$_{B-}$(π/8);
  N1CC2$_{A-B+}$ is equal to the ratio between the number of times when, given the above-mentioned first and second bits, the first bit is equal to "1" and the second bit is equal to "0", and the product 4*Ch$_{A-}$(π/8)*Ch$_{B+}$(π/8); and
  N1CC2$_{A-B-}$ is equal to the ratio between the number of times when, given the above-mentioned first and second bits, the first and the second are both equal to "1", and the product 4*Ch$_{A-}$(π/8)*Ch$_{B-}$(π/8).

Examples regarding the third and the fourth elementary substring are shown in FIG. 5.

In this way, both the first and the second processing unit 114 and 124 can then calculate the additional parameters NS01(0, π/8) and NS10(π/8, 0). In particular, the additional parameter NS01(0, π/8) is obtained by:
  calculating the normalized probabilities of coincidence detection NPC$_{A+B+}$(0, π/8), NPC$_{A-B-}$(0, π/8), NPC$_{A+B-}$(0, π/8) and NPC$_{A-B+}$(0, π/8), by using the equations (27), where N1C$_{A+B+}$=N1CC1$_{A+B+}$, N1C$_{A-B-}$=N1CC1$_{A-B-}$, N1C$_{A+B-}$=N1CC1$_{A+B-}$ and N1C$_{A-B+}$=N1CC1$_{A-B+}$ are set;
  using the normalized probabilities of coincidence detection NPC$_{A+B+}$(0, π/8), NPC$_{A-B-}$(0, π/8), NPC$_{A+B-}$(0, π/8) and NPC$_{A-B+}$(0, π/8), as calculated in equation (29).

Both the first and the second processing unit 114 and 124 can also calculate the additional parameter NS10(π/8, 0). In particular, the additional parameter NS10(π/8, 0) is obtained by:
  calculating the normalized probabilities of detection coincidence NPC$_{A-B+}$(π/8, 0), NPC$_{A-B-}$(π/8, 0), NPC$_{A+B-}$(π/8, 0) and NPC$_{A-B+}$(π/8, 0), by using the equations (27), where N1C$_{A+B+}$=N1CC2$_{A+B+}$, N1C$_{A-B-}$=N1CC2$_{A-B-}$, N1C$_{A+B-}$=N1CC2$_{A+B-}$ and N1C$_{A-B+}$=N1CC2$_{A-B+}$ are set;

using the normalized probabilities of coincidence detection NPC$_{A+B+}$(π/8, 0), NPC$_{A-B-}$(π/8, 0), NPC$_{A+B-}$(π/8, 0) and NPC$_{A-B+}$(π/8, 0), as calculated in equation (30).

The first and the second processing unit 114 and 124 also respectively determine a first and a second basic substring, the first basic substring being formed by the bits of the first correlated substring determined with φ=0°, and the second basic substring being formed by the bits of the second correlated substring determined with θ=0°. Purely by way of example, with reference to the examples shown in FIG. 5, the first and the second basic substring would both be equal to "011".

In addition, the first and the second processing unit 114 and 124 respectively determine a third and a fourth basic substring, the third basic substring being formed by the bits of the first correlated substring determined with φ=π/8, and the fourth basic substring being formed by the bits of the second correlated substring determined with θ=π/8. Purely by way of example, with reference to the examples shown in FIG. 5, the third and the fourth basic substring would both be equal to "01".

The first and the second processing unit 114 and 124 then calculate a first and a second value, which shall be referred to as QBER_00 and QBER_4545, respectively.

In detail, QBER_00 indicates the percentage of differing bits between the first and the second, basic substring, while QBER_4545 indicates the percentage of differing bits between the third and the fourth basic substring.

The calculation of QBER_00 and QBER_4545 takes place without the first and the second processing unit 114 and 124 entirely exchanging, or rather reciprocally communicating, any of the first, second, third and fourth basic substrings, and therefore without risk to security. In other words, in order to avoid the risk of disclosing the first and second raw keys, the first and the second processing units 114 and 124 calculate QBER_00 and QBER_4545 without entirely exchanging the first and the second correlated substring.

For example, in order to determine QBER_00, the first and the second processing unit 114 and 124 can determine a first and a second test sequence, respectively equal to a portion of the first basic substring and to the corresponding portion of the second basic substring, and reciprocally communicate, for example over the conventional link, these first and second test sequences, and set QBER_00 equal to the number of errors present in the first and second test sequences.

Always by way of example, in order to determine QBER_4545, the first and the second processing unit 114 and 124 can determine a third and a fourth test sequence, respectively equal to a portion of the third basic substring and to the corresponding portion of the fourth basic substring, and reciprocally communicate, for example over the conventional link, these third and fourth test sequences, and set QBER_4545 equal to the number of errors present in the third and fourth test sequences.

At a theoretical level, it is also possible to demonstrate the validity of the relation:

$$QBER00 = \frac{C_{A-B+} + C_{A+B-}}{C_{A+B+} + C_{A-B-} + C_{A-B+} + C_{A+B-}} \quad (31)$$

where specification of the dependence of the coincidence counts $C_{A+B+}$, $C_{A-B+}$, $C_{A+B-}$ and $C_{A-B-}$ on (φ, θ)=(0, 0) has been omitted. In addition, it can be observed that:

coefficient $C_{A+B+}$ is equal to the number of times when, given a mutually corresponding (i.e. regarding a same converted pair of photons) first bit and second bit of the first and the second basic substring, respectively, both of them are equal to "0";

coefficient $C_{A+B-}$ is equal to the number of times when, again given the above-mentioned first and second bits, the first bit is equal to "0" and the second bit is equal to "1";

coefficient $C_{A-B+}$ is equal to the number of times when, given the above-mentioned first and second bits, the first bit is equal to "1" and the second bit is equal to "0"; and coefficient $C_{A-B-}$ is equal to the number of times when, given the above-mentioned first and second bits, these are both equal to "1".

Since, as previously mentioned, the first and the second processing unit 114 and 124 do not reciprocally communicate the first and the second basic substring, they cannot determine the coefficients $C_{A+B+}$, $C_{A+B-}$, $C_{A-B+}$ and $C_{A-B-}$. However, the first and the second processing unit 114 and 124 know the value of the addition $C_{A+B+}+C_{A+B-}+C_{A-B+}+C_{A-B-}$, equal to the total number of bits contained in the first (and equivalently, in the second) basic substring.

In addition, we have:

$$\frac{C_{A-B+}+C_{A+B-}}{C_{A+B+}+C_{A-B-}+C_{A-B+}+C_{A+B-}} = \qquad (32)$$

$$\frac{\eta_{A+}\eta_{B-}NPC_{A+B-}+\eta_{A-}\eta_{B+}NPC_{A-B+}}{\eta_{A+}\eta_{B+}NPC_{A+B+}+\eta_{A-}\eta_{B-}NPC_{A-B-}+}$$
$$\eta_{A+}\eta_{B-}NPC_{A+B-}+\eta_{A-}\eta_{B+}NPC_{A-B+}$$

It is also admissible to assume:

$$NPC_{A+B-}=NPC_{A-B+}=NCW/2$$

$$NPC_{A+B+}=NPC_{A-B-}=NCR/2 \qquad (33)$$

where NCW/2 and NCR/2 are two unknown parameters.

This gives:

$$QBER00 = \frac{(\eta_{A+}\eta_{B-}+\eta_{A-}\eta_{B+})NCW/2}{(\eta_{A+}\eta_{B+}+\eta_{A-}\eta_{B-})NCR/2+(\eta_{A+}\eta_{B-}+\eta_{A-}\eta_{B+})NCW/2} \qquad (34)$$

and consequently:

$$\frac{NCR}{NCW} = \frac{(\eta_{A+}\eta_{B-}+\eta_{A-}\eta_{B+})(1-QBER00)}{(\eta_{A+}\eta_{B+}+\eta_{A-}\eta_{B-})QBER00} \qquad (35)$$

Remembering the first and the fourth equation of equations (28), it can thus be concluded that:

$$p = \frac{NPC_{A+B-}+NPC_{A-B-}-NPC_{A+B-}-NPC_{A-B+}}{NPC_{A+B-}+NPC_{A-B-}+NPC_{A+B+}+NPC_{A-B+}} \qquad (36)$$

$$= \frac{NCR-NCW}{NCR+NCW}$$

$$= \frac{\frac{NCR}{NCW}-1}{\frac{NCR}{NCW}+1}$$

$$= \frac{\frac{(\eta_{A+}\eta_{B-}+\eta_{A-}\eta_{B+})(1-QBER00)}{(\eta_{A+}\eta_{B+}+\eta_{A-}\eta_{B-})QBER00}-1}{\frac{(\eta_{A+}\eta_{B-}+\eta_{A-}\eta_{B+})(1-QBER00)}{(\eta_{A+}\eta_{B+}+\eta_{A-}\eta_{B-})QBER00}+1}$$

$$= \frac{(\eta_{A+}\eta_{B-}+\eta_{A-}\eta_{B+})(1-QBER00)-(\eta_{A+}\eta_{B+}+\eta_{A-}\eta_{B-})QBER00}{(\eta_{A+}\eta_{B-}+\eta_{A-}\eta_{B+})(1-QBER00)+(\eta_{A+}\eta_{B+}+\eta_{A-}\eta_{B-})QBER00}$$

Similarly to what has been said regarding QBER00 and the first and the second basic substring, on the basis of the third and the fourth basic substring and QBER4545, it is also possible to demonstrate that:

$$p\sin(2\gamma)F(\tau) = \frac{\begin{array}{c}(\eta_{A+}\eta_{B-}+\eta_{A-}\eta_{B+})(1-QBER4545)-\\(\eta_{A+}\eta_{B+}+\eta_{A-}\eta_{B-})QBER4545\end{array}}{\begin{array}{c}(\eta_{A+}\eta_{B-}+\eta_{A-}\eta_{B+})(1-QBER4545)+\\(\eta_{A+}\eta_{B+}+\eta_{A-}\eta_{B-})QBER4545\end{array}} \qquad (37)$$

In consideration of the above, on the basis of the calculated QBER00 and equation (36), each of the first and the second processing unit 114 and 124 calculates the value of p, which is indicative of the white noise contribution. To this end, it is not necessary to know the quantum efficiencies $\eta_{A+}$, $\eta_{A-}$, $\eta_{B+}$ and $\eta_{B-}$; in fact, thanks to equations (20), the latter can be expressed as a function of the single counts of the respective photodetectors with bases at 22.5° ($Ch_{A+}(\pi/8)$, $Ch_{A-}(\pi/8)$, $Ch_{B+}(\pi/8)$ and $Ch_{B-}(\pi/8)$) (known) and the number R of two-photon states generated (unknown), the dependence of p on the number R of two-photon states generated becoming simpler within equation (36). In other words, the following relation holds:

$$p = \frac{\begin{array}{c}(Ch_{A+(\pi/8)}Ch_{B-(\pi/8)}+Ch_{A-(\pi/8)}Ch_{B+(\pi/8)})(1-QBER00)-\\(Ch_{A+(\pi/8)}Ch_{B+(\pi/8)}+Ch_{A-(\pi/8)}Ch_{B-(\pi/8)})QBER00\end{array}}{\begin{array}{c}(Ch_{A+(\pi/8)}Ch_{B-(\pi/8)}+Ch_{A-(\pi/8)}Ch_{B+(\pi/8)})(1-QBER00)+\\(Ch_{A+(\pi/8)}Ch_{B+(\pi/8)}+Ch_{A-(\pi/8)}Ch_{B-(\pi/8)})QBER00\end{array}} \qquad (38)$$

Furthermore, once the value of p is known, each of the first and the second processing unit 114 and 124 calculates, alternatively on the basis of any of the additional parameters NS01(0, $\pi/8$) and NS10($\pi/8$, 0), or on an average of them, the value of $\gamma$, which, as said, is indicative of imbalance.

Finally, once the values of p and $\gamma$ are known, each of the first and the second processing unit 114 and 124 calculate, on the basis of QBER4545 and equation (37), the value of $F(\tau)$, which is proportional to the coloured noise. Also in this case, it is not necessary to know the quantum efficiencies $\eta_{A+}$, $\eta_{A-}$, $\eta_{B+}$ and $\eta_{B-}$, but it is possible to resort to equations (20) and express them as a function of the single counts of the respective photodetectors with bases at 22.5° (known) and the number R of two-photon states generated (unknown), the dependence of $\tau$ on the number R of two-photon states generated becoming simpler within equation (37). In other words, the following relation holds:

$$p\sin(2\gamma)F(\tau) = \qquad (39)$$

$$\frac{\begin{array}{c}(Ch_{A+(\pi/8)}Ch_{B-(\pi/8)}+Ch_{A-(\pi/8)}Ch_{B+(\pi/8)})(1-QBER4545)-\\(Ch_{A+(\pi/8)}Ch_{B+(\pi/8)}+Ch_{A-(\pi/8)}Ch_{B-(\pi/8)})QBER4545\end{array}}{\begin{array}{c}(Ch_{A+(\pi/8)}Ch_{B-(\pi/8)}+Ch_{A-(\pi/8)}Ch_{B+(\pi/8)})(1-QBER4545)+\\(Ch_{A+(\pi/8)}Ch_{B+(\pi/8)}+Ch_{A-(\pi/8)}Ch_{B-(\pi/8)})QBER4545\end{array}}$$

In doing so, the first and the second processing unit 114 and 124 arrive at estimating the noise associated with the output state of the first optical beam splitter 24.

The noise estimate can then be used for compensating the cryptographic key distribution system 10 and/or for detecting possible eavesdropping.

For example, the estimating system can be calibrated to cancel the coloured noise contribution and the noise contribution caused by imbalance, for example by rotation of the crystal 14 and/or changing the first and/or the second optical path 30 and/or 32. The remaining white noise contribution is then used as an indicator of possible eavesdropping, for example by comparison with a threshold value, the exceeding of which implies that eavesdropping has occurred.

In practice, the operations described are equivalent to solving a system of at least three equations with three unknowns (p, γ, F(τ)), which comprises the fourth and the fifth equation from equations (28), as well as at least one of equations (29) and (30).

The advantages that can be achieved with the present method clearly emerge from the foregoing description. In particular, it enables estimating the noise that afflicts an entangled state by using measurements that, during a QKD process, ipso facto, would be discarded.

Finally, it is clear that that various modifications and changes can be made to the present method and system for estimating noise, without leaving the scope of protection of the present invention.

For example, determination of the values of p and γ could be performed by just one of the first and second processing units 114 and 124. It is also possible that the two-photon entangled state is of a different type from that described. In general, this state may be, for example, any of the so-called Bell states. In this case, consequent modifications would be made to the mathematical relations, as well as the definitions of QBER_00 and QBER4545. For example, in the case of the singlet state, QBER_00 indicates the percentage of bits that are the same in the first and the second basic substring, while QBER_4545 indicates the percentage of bits that are the same in third and the fourth basic substring. In other words, QBER_00 indicates, in general, the number of bits of the first basic substring that do not respect a selected relation with the corresponding bits of the second basic substring, this relation being alternatively of equality or difference, according to the Bell state; similarly, QBER_4545 indicates the number of bits of the third basic substring that do not respect the selected relation with the corresponding bits of the fourth basic substring.

Moreover, it is possible that the first and the second optical paths 30 and 32 are different, and also that one or more components of the estimating system 100 are different with respect to that described. For example, there could be free space instead of the first and the second span of optical fibre 54 and 56.

In this connection, it should be further stated that also in the case where the first and the second span of optical fibre 54 and 56 have significant lengths, such as lengths exceeding a kilometer for example, the described procedure does not change. In fact, assuming that the first span of optical fibre 54 has, in any case, each of its main optical axes aligned with a corresponding optical axis of the first optical beam splitter 24 and with a corresponding optical axis of the second optical beam splitter 64, and that the second span of optical fibre 56 has each of its main optical axes aligned with a corresponding optical axis of the first optical beam splitter 24 and with a corresponding optical axis of the third optical beam splitter 78, the state can described as:

$$\rho(p, \gamma, \tau) = \begin{pmatrix} \frac{1-p}{4} + p\cos^2(\gamma) & 0 & 0 & e^{-i\alpha} p \frac{\sin(2\gamma)}{2} F(\tau) \\ 0 & \frac{1-p}{4} & 0 & 0 \\ 0 & 0 & \frac{1-p}{4} + & 0 \\ e^{i\alpha} p \frac{\sin(2\gamma)}{2} F(\tau) & 0 & 0 & \frac{1-p}{4} + p\sin^2(\gamma) \end{pmatrix} \tag{40}$$

where:

$$F(\tau) = \operatorname{Rect}\left(\frac{2\tau + D_f(L_1 - L_1)}{2DL}\right) \tag{41}$$

$$\left(1 - 2\left|\frac{2\tau + D_f(L_1 - L_2)}{2DL}\right|\right) e^{-\sigma_p^2 \left[\frac{\lambda}{D}(2\tau + D_f(L_1 - L_1)) + D_f \frac{(L_1 + L_2)}{2}\right]^2}$$

and where $L_1$ and $L_2$ are the lengths of the first and the second span of optical fibre 54 and 56; moreover, $\alpha = (K_e - K_o)(L_1 + L_2)$, with $K_e$ and $K_o$ indicating the propagation constants of the extraordinary photon and the ordinary photon. The following relation also holds:

$$D_f = \left(\frac{1}{u_{ef}} - \frac{1}{u_{of}}\right) \tag{42}$$

where $u_{ef}$ and $u_{of}$ are the reciprocals of the group velocities along the two main optical axes.

It is therefore possible to align the estimating system 100 before carrying out the described method, so as to annul the phase term $\alpha = (K_e - K_o)(L_1 + L_2)$.

Finally, the estimating system 100 can also comprise a first and a second quarter-wave plate, which are respectively connected to the first and the second output of the first optical beam splitter 24, i.e. they are arranged to receive the photons that respectively leave the first and the second output of the first optical beam splitter 24. For example, the first quarter-wave plate can be interposed between the first span of optical fibre 54 and the second half-wave plate 44, while the second quarter-wave plate may be interposed between the second span of optical fibre 56 and the third half-wave plate 46. The first and the second quarter-wave plate perform the function of enabling the determination of additional tomographic measurements with respect to those available during a cryptographic key distribution process.

The invention claimed is:

1. A method for estimating the noise of a two-photon entangled state, the method comprising:
 providing a first communication unit, including a first polarization rotator and a first receiving unit, and a second communication unit, including a second polarization rotator and a second receiving unit, each of said first and second polarization rotators being controllable so as to assume alternatively a first position or a second position;
 generating a plurality of pairs of photons, each pair of photons including a first photon, directed toward the first communication unit through a first optical path, and a second photon, directed toward the second communication unit through a second optical path;
 for each pair of photons:
 arranging, by the first and by the second communication unit, respectively, the first and the second polarization rotator alternatively in the first position or in the second position, in a random and independent manner;

measuring, by the first receiving unit, the polarization of the first photon, downstream of the first polarization rotator, thereby defining a first polarization measurement, associated with a first rotation angle, which indicates the position in which the first polarization rotator is arranged;

measuring, by the second receiving unit, the polarization of the second photon, downstream of the second polarization rotator, thereby defining a second polarization measurement, associated with a second rotation angle, which indicates the position in which the second polarization rotator is arranged;

wherein each of the first and second polarization measurements is alternatively equal to a first polarization value or to a second polarization value, and each of the first and second rotation angles is alternatively equal to a first reference angle or a second reference angle;

generating, by the first receiving unit, a first string of measurements and a first string of angles including, respectively, for each pair of photons, the corresponding first polarization measurement and the corresponding first rotation angle;

generating, by the second receiving unit, a second string of measurements and a second string of angles including, respectively, for each pair of photons, the corresponding second polarization measurement and the corresponding second rotation angle;

communicating, by the first receiving unit, the first string of angles to the second receiving unit;

communicating, by the second receiving unit, the second string of angles to the first receiving unit;

generating, by the first receiving unit, a first uncorrelated substring, formed by the polarization measurements of the first string of measurements associated with rotation angles that are different from the corresponding rotation angles of the second string of angles;

generating, by the second receiving unit, a second uncorrelated substring, formed by the polarization measurements of the second string of measurements associated with rotation angles that are different from the corresponding rotation angles of the first string of angles;

communicating, by the second receiving unit, the second uncorrelated substring to the first receiving unit;

generating, by the first receiving unit, a first correlated substring, formed by the polarization measurements of the first string of measurements associated with rotation angles that are equal to the corresponding rotation angles of the second string of angles;

generating, by the second receiving unit, a second correlated substring, formed by the polarization measurements of the second string of measurements associated with rotation angles that are equal to the corresponding rotation angles of the first string of angles;

selecting, by the first receiving unit, a first and a second portion of the first correlated substring, formed by the polarization measurements of the first correlated substring associated respectively with the first and the second reference angle;

selecting, by the second receiving unit, a first and a second portion of the second correlated substring, formed by the polarization measurements of the second correlated substring associated respectively with the first and the second reference angle;

by the first receiving unit:
selecting a relation between a relation of equality and a relation of difference;

determining, through cooperation with the second receiving unit, a first error value, indicating the number of polarization measurements of the first portion of the first correlated substring that do not respect the selected relation with the corresponding polarization measurements of the first portion of the second correlated substring;

determining, through cooperation with the second receiving unit, a second error value, indicating the number of polarization measurements of the second portion of the first correlated substring that do not respect the selected relation with the corresponding polarization measurements of the second portion of the second correlated substring;

determining, by the first receiving unit, estimates of at least two noise contributions among a white noise contribution, a colored noise contribution and a noise contribution caused by imbalance, on the basis of the first and the second uncorrelated substring, wherein determining an estimate of the at least two noise contributions includes determining the estimate on the basis of the first and second error value; and wherein the noise contribution caused by imbalance is caused by misalignments between the alignment of the first optical path and the first receiving unit, and the alignment between the second optical path and the second receiving unit, and by a difference between polarization dependent losses afflicting the first and the second optical paths.

2. The method according to claim 1, wherein determining a first error value comprises:

determining, by the first receiving unit, a first test sequence, equal to a non-entire part of the first portion of the first correlated substring;

determining, by the second receiving unit, a second test sequence, equal to a non-entire part of the first portion of the second correlated substring;

communicating the second test sequence from the second receiving unit to the first receiving unit;

setting, by the first receiving unit, the first error value equal to a value indicating the number of polarization measurements of the first test sequence that do not respect the selected relation with the corresponding polarization measurements of the second test sequence.

3. The method according to claim 1, wherein determining a second error value comprises:

determining, by the first receiving unit, a third test sequence, equal to a non-entire part of the second portion of the first correlated substring;

determining, by the second receiving unit, a fourth test sequence, equal to a non-entire part of the second portion of the second correlated substring;

communicating the fourth test sequence from the second receiving unit to the first receiving unit;

setting, by the first receiving unit, the second error value equal to a value indicating the number of polarization measurements of the third test sequence that do not respect the selected relation with the corresponding polarization measurements of the fourth test sequence.

4. The method according to claim 1, further comprising:

determining, by the first receiving unit, a first normalization coefficient, proportional to the number of polarization measurements of the first string of measurements equal to the first polarization value and associated with the first reference angle;

determining, by the first receiving unit, a second normalization coefficient, proportional to the number of polarization measurements of the first string of measurements equal to the second polarization value and associated with the first reference angle;

determining, by the second receiving unit, a third normalization coefficient, proportional to the number of polarization measurements of the second string of measurements equal to the first polarization value and associated with the first reference angle;

determining, by the second receiving unit, a fourth normalization coefficient, proportional to the number of polarization measurements of the second string of measurements equal to the second polarization value and associated with the first reference angle; and communicating the third and the fourth normalization coefficient from the second receiving unit to the first receiving unit;

by the first receiving unit:

selecting an angle between the first and second reference angles;

selecting a first portion of the first uncorrelated substring and the corresponding portion of the second uncorrelated substring, said first portion of the first uncorrelated substring being formed by the polarization measurements of the first uncorrelated substring respectively associated with the selected angle;

determining a first number of coincidences, proportional to the number of polarization measurements of the first portion of the first uncorrelated substring equal to the first polarization value, and whose corresponding polarization measurements of said corresponding portion of the second uncorrelated sub string are equal to the first polarization value;

determining a second number of coincidences, proportional to the number of polarization measurements of the first portion of the first uncorrelated substring equal to the first polarization value, and whose corresponding polarization measurements of said corresponding portion of the second uncorrelated sub string are equal to the second polarization value;

determining a third number of coincidences, proportional to the number of polarization measurements of the first portion of the first uncorrelated substring equal to the second polarization value, and whose corresponding polarization measurements of said corresponding portion of the second uncorrelated sub string are equal to the first polarization value;

determining a fourth number of coincidences, proportional to the number of polarization measurements of the first portion of the first uncorrelated substring equal to the second polarization value, and whose corresponding polarization measurements of said corresponding portion of the second uncorrelated sub string are equal to the second polarization value;

determining a first normalized number, proportional to the ratio between said first number of coincidences and the product of the first and third normalization coefficients;

determining a second normalized number, proportional to the ratio between said second number of coincidences and the product of the first and fourth normalization coefficients;

determining a third normalized number, proportional to the ratio between said third number of coincidences and the product of the second and third normalization coefficients;

determining a fourth normalized number, proportional to the ratio between said fourth number of coincidences and the product of the second and fourth normalization coefficients;

determining a first probability, proportional to the ratio between the first normalized number and the sum of said first, second, third and fourth normalized numbers;

determining a second probability, proportional to the ratio between the second normalized number and the sum of said first, second, third and fourth normalized numbers;

determining a third probability, proportional to the ratio between the third normalized number and the sum of said first, second, third and fourth normalized numbers;

determining a fourth probability, proportional to the ratio between the fourth normalized number and the sum of said first, second, third and fourth normalized numbers;

determining an additional parameter, equal to an algebraic sum of said first, second, third and fourth probabilities; and determining a value indicating the white noise contribution, a value indicating the noise contribution caused by imbalance and a value indicating the colored noise contribution, on the basis of the first and second error values, the first, second, third and fourth normalization coefficients and the additional parameter.

5. The method according to claim 4, further comprising, by the first receiving unit:

determining the value indicating the white noise contribution, on the basis of the second error value and the first, second, third and fourth normalization coefficients; and determining the value indicating the noise contribution caused by imbalance, on the basis of the value indicating the white noise contribution and the additional parameter.

6. The method according to claim 5, further comprising determining, by the first receiving unit, the value indicating the colored noise contribution as a function of the value indicating the noise contribution caused by imbalance, of the value indicating the white noise contribution, of the first error value and of the first, second, third and fourth normalization coefficients.

7. The method according to claim 1, further comprising determining, by the first receiving unit, a cryptographic key, on the basis of the first correlated sub string.

8. A method for estimating the noise of a two-photon entangled state, the method comprising:

providing a first communication unit, including a first polarization rotator and a first receiving unit, and a second communication unit, including a second polarization rotator and a second receiving unit, each of said first and second polarization rotators being controllable so as to assume alternatively a first position or a second position;

generating a plurality of pairs of photons, each pair of photons including a first photon, directed toward the first communication unit through a first optical path, and a second photon, directed toward the second communication unit through a second optical path;

for each pair of photons:
arranging, by the first and by the second communication unit, respectively, the first and the second polarization rotator alternatively in the first position or in the second position, in a random and independent manner;
measuring, by the first receiving unit, the polarization of the first photon, downstream of the first polarization rotator, thereby defining a first polarization measurement, associated with a first rotation angle, which indicates the position in which the first polarization rotator is arranged;
measuring, by the second receiving unit, the polarization of the second photon, downstream of the second polarization rotator, thereby defining a second polarization measurement, associated with a second rotation angle, which indicates the position in which the second polarization rotator is arranged;

generating, by the first receiving unit, a first string of measurements and a first string of angles including, respectively, for each pair of photons, the corresponding first polarization measurement and the corresponding first rotation angle;
generating, by the second receiving unit, a second string of measurements and a second string of angles including, respectively, for each pair of photons, the corresponding second polarization measurement and the corresponding second rotation angle;
communicating, by the first receiving unit, the first string of angles to the second receiving unit;
communicating, by the second receiving unit, the second string of angles to the first receiving unit;
generating, by the first receiving unit, a first uncorrelated substring, formed by the polarization measurements of the first string of measurements associated with rotation angles that are different from the corresponding rotation angles of the second string of angles;
generating, by the second receiving unit, a second uncorrelated substring, formed by the polarization measurements of the second string of measurements associated with rotation angles that are different from the corresponding rotation angles of the first string of angles;
communicating, by the second receiving unit, the second uncorrelated substring to the first receiving unit;
determining, by the first receiving unit, estimates of at least two noise contributions among a white noise contribution, a colored noise contribution and a noise contribution caused by imbalance, on the basis of the first and the second uncorrelated substring; and
wherein the noise contribution caused by imbalance is caused by misalignments between the alignment of the first optical path and the first receiving unit, and the alignment between the second optical path and the second receiving unit, and by a difference between polarization dependent losses afflicting the first and the second optical paths; and
wherein each of said first and second polarization measurement is alternatively equal to a first or second polarization value, and each of said first and second rotation angle is alternatively equal to a first reference angle or a second reference angle;

said method further comprising:
generating, by the first receiving unit, a first correlated substring, formed by the polarization measurements of the first string of measurements associated with rotation angles that are equal to the corresponding rotation angles of the second string of angles;
generating, by the second receiving unit, a second correlated substring, formed by the polarization measurements of the second string of measurements associated with rotation angles that are equal to the corresponding rotation angles of the first string of angles;
selecting, by the first receiving unit, a portion of the first correlated sub string, formed by the polarization measurements of the first correlated substring associated with the second reference angle;
selecting, by the second receiving unit, a portion of the second correlated substring, formed by the polarization measurements of the second correlated substring associated with the second reference angle;
by the first receiving unit, the steps of:
selecting a relation between a relation of equality and a relation of difference; and
determining, through cooperation with the second receiving unit, an error value, indicating the number of polarization measurements of the portion of the first correlated substring that do not respect the selected relation with the corresponding polarization measurements of the portion of the second correlated substring;
determining, by the first receiving unit, a first normalization coefficient, proportional to the number of polarization measurements of the first string of measurements equal to the first polarization value and associated with the first reference angle;
determining, by the first receiving unit, a second normalization coefficient, proportional to the number of polarization measurements of the first string of measurements equal to the second polarization value and associated with the first reference angle;
determining, by the second receiving unit, a third normalization coefficient, proportional to the number of polarization measurements of the second string of measurements equal to the first polarization value and associated with the first reference angle;
determining, by the second receiving unit, a fourth normalization coefficient, proportional to the number of polarization measurements of the second string of measurements equal to the second polarization value and associated with the first reference angle;
communicating the third and the fourth normalization coefficient from the second receiving unit to the first receiving unit; and
determining, by the first receiving unit, a value indicating the white noise contribution, on the basis of the error value and the first, second, third, and fourth normalization coefficients.

9. A system for estimating the noise of a two-photon entangled state, the system comprising:
a first communication unit, including a first polarization rotator and a first receiving unit, and a second communication unit, including a second polarization rotator and a second receiving unit, each of said first and second polarization rotator being controllable so as to assume alternatively a first or a second position;
an optical source configured to generate a plurality of pairs of photons, each pair of photons including a first photon, directed toward the first communication unit through a first optical path, and a second photon, directed toward the second communication unit through a second optical path;

wherein said first and second communication units are further configured to arrange, for each pair of photons, respectively the first and the second polarization rotator alternatively in the first or in the second position, in a random and independent manner; and wherein the first receiving unit comprises:
- a first gauge configured to measure the polarization of the first photon, downstream of the first polarization rotator, thereby defining a first polarization measurement, and to associate said first polarization measurement with a first rotation angle, which indicates the position in which the first polarization rotator is arranged;
- a first generator configured to generate a first string of measurements and a first string of angles including, respectively, for each pair of photons, the corresponding first polarization measurement and the corresponding first rotation angle; and
- a first communication module configured to communicate the first string of angles to the second receiving unit;

wherein the second receiving unit comprises:
- a second gauge configured to measure the polarization of the second photon, downstream of the second polarization rotator, thereby defining a second polarization measurement, and to associate said second polarization measurement with a second rotation angle, which indicates the position in which the second polarization rotator is arranged;
- a second generator configured to generate a second string of measurements and a second string of angles including, respectively, for each pair of photons, the corresponding second polarization measurement and the corresponding second rotation angle; and
- a second communication module configured to communicate the second string of angles to the first receiving unit;

wherein each of the first and second polarization measurements is alternatively equal to a first polarization value or a second polarization value, and each of the first and second rotation angles is alternatively equal to a first or a second reference angle;

wherein the first receiving unit further comprises a third generator configured to generate a first uncorrelated substring, formed by the polarization measurements of the first string of measurements associated with rotation angles that are different from the corresponding rotation angles of the second string of angles;

wherein the second receiving unit further comprises:
- a fourth generator configured to generate a second uncorrelated substring, formed by the polarization measurements of the second string of measurements associated with rotation angles that are different from the corresponding rotation angles of the first string of angles; and
- a third communication module configured to communicate the second uncorrelated sub string to the first receiving unit;

wherein the first receiving unit further comprises:
- a fifth generator configured to generate a first correlated substring, formed by the polarization measurements of the first string of measurements associated with rotation angles that are equal to the corresponding rotation angles of the second string of angles;
- a first selector configured to select a first and a second portion of the first correlated substring, formed by the polarization measurements of the first correlated substring associated respectively with the first and second reference angles; and
- a setting module configured to select a relation between a relation of equality and a relation of difference; and wherein the second receiving unit (RB) further comprises:
- a sixth generator configured to generate a second correlated substring, formed by the polarization measurements of the second string of measurements associated with rotation angles that are equal to the corresponding rotation angles of the first string of angles; and
- a second selector configured to select a first and a second portion of the second correlated substring, formed by the polarization measurements of the second correlated substring associated respectively with the first and with the second reference angle;

wherein the first receiving unit further comprises:
- a first determination module configured to determine, through cooperation with the second receiving unit, a first error value, indicating the number of polarization measurements of the first portion of the first correlated substring that do not respect the selected relation with the corresponding polarization measurements of the first portion of the second correlated substring; and
- a second determination module configured to determine, through cooperation with the second receiving unit, a second error value, indicating the number of polarization measurements of the second portion of the first correlated substring that do not respect the selected relation with the corresponding polarization measurements of the second portion of the second correlated substring; and wherein the first receiving unit further comprises an estimator configured to determine estimates of at least two noise contributions among a white noise contribution, a colored noise contribution and a noise contribution caused by imbalance, on the basis of the first and the second uncorrelated substring and the first and second error values; and wherein the noise contribution caused by imbalance is caused by misalignments between the alignment of the first optical path and the first receiving unit, and the alignment between the second optical path and the second receiving unit, and by a difference between polarization dependent losses afflicting the first and the second optical paths.

* * * * *